United States Patent [19]
Iwamoto et al.

[11] Patent Number: 5,119,189
[45] Date of Patent: Jun. 2, 1992

[54] STEREOSCOPIC IMAGING SYSTEM

[75] Inventors: Taro Iwamoto, Mito; Kichio Nakajima, Ibaraki; Hiroshi Yamamoto, Tsuchiura; Yuko Okada; Yukio Sumiya, both of Ibaraki, all of Japan

[73] Assignee: Hitachi, Ltd., Tokyo, Japan

[21] Appl. No.: 602,864

[22] Filed: Oct. 24, 1990

[30] Foreign Application Priority Data

Oct. 25, 1989 [JP]  Japan .................................. 1-278023
Aug. 29, 1990 [JP]  Japan .................................. 2-225316

[51] Int. Cl.⁵ ..................... H04N 13/00; H04N 13/02; H04N 13/04
[52] U.S. Cl. ........................................ 358/88; 358/225
[58] Field of Search ............................. 358/88, 92, 225

[56] References Cited
U.S. PATENT DOCUMENTS 4,751,570  6/1988  Robinson ............................... 358/88
4,956,705  9/1990  Wright ................................. 358/225

Primary Examiner—Howard W. Britton
Attorney, Agent, or Firm—Antonelli, Terry, Stout & Kraus

[57] ABSTRACT

A stereoscopic imaging system enabling observation of a stereoscopic image due to parallax by reproducing, on a single screen in an image-reproducing means two kinds of images of an object which are taken by two imaging units and between which there is parallax and by observing the images in such a manner that the left and right eyes of the observer observe only the separate images taken by the separate imaging units corresponding to the left and right eyes, wherein there is provided swing means for mechanically or electronically shifting the optical axes of the respective lenses of said two imaging units, by which swing means the observer can view a stereoscopic image without fatigue and in a natural condition.

7 Claims, 34 Drawing Sheets

F I G. 15
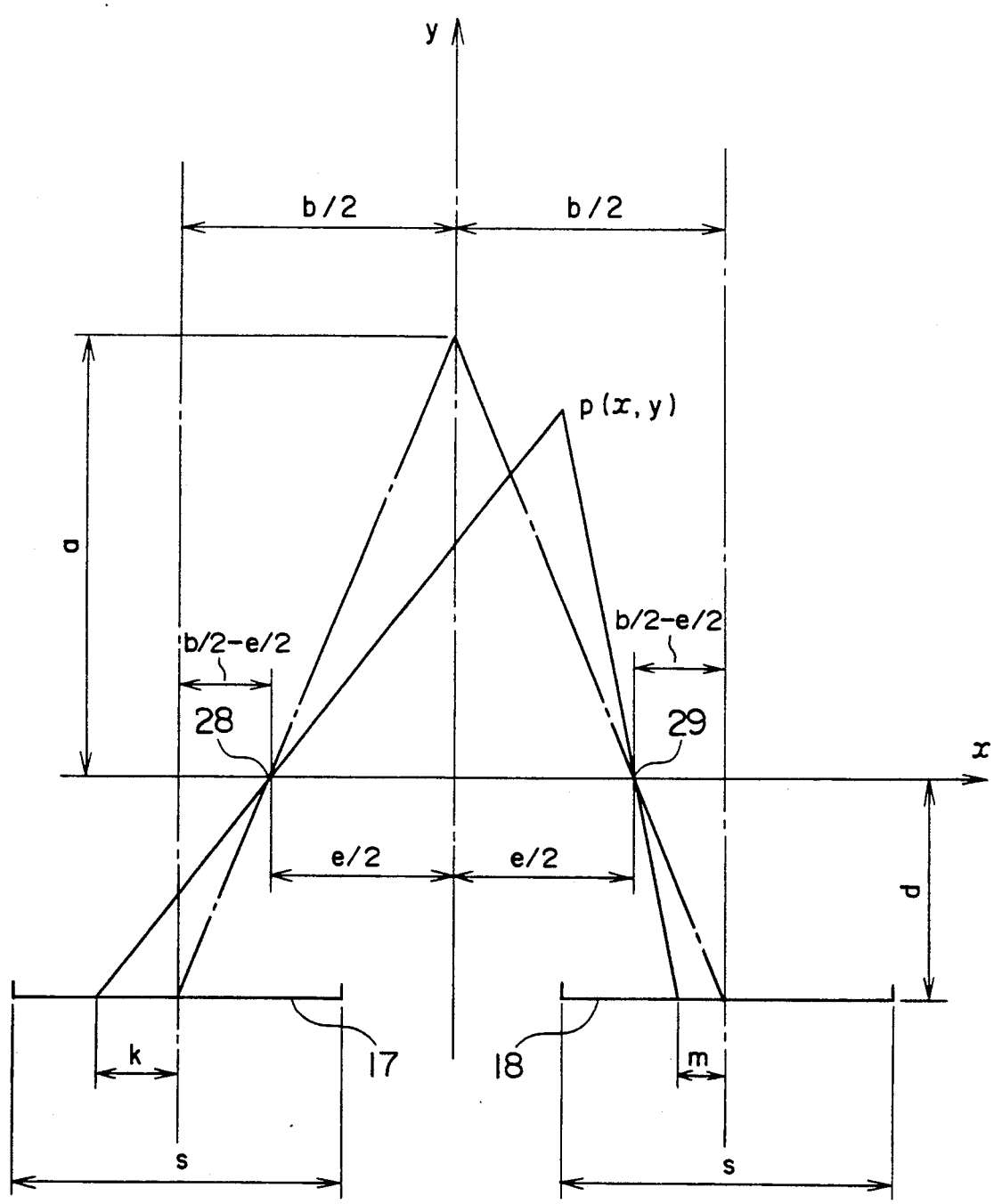

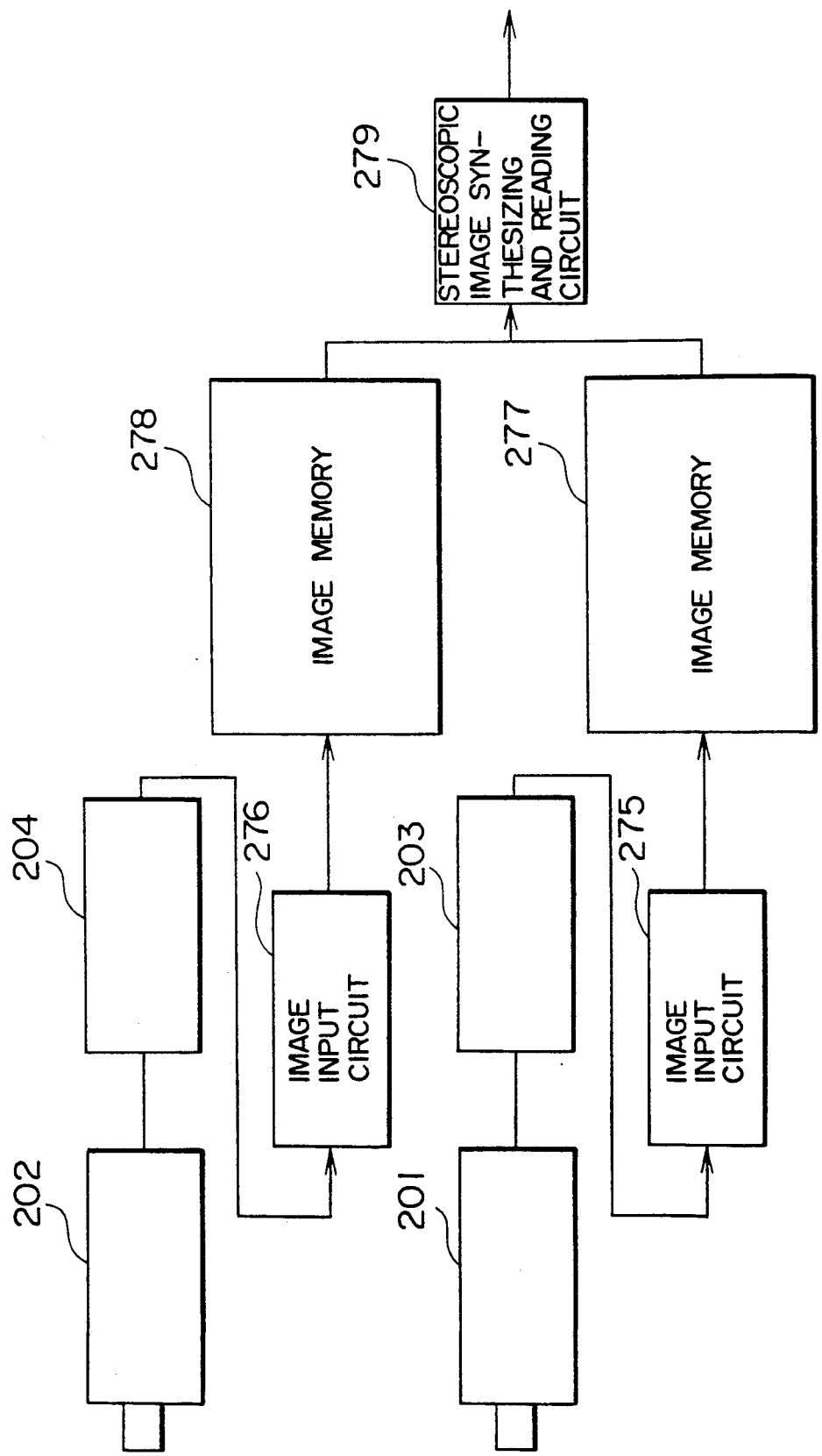
F I G. 32

STEREOSCOPIC IMAGING SYSTEM

BACKGROUND OF THE INVENTION

This invention relates to a stereoscopic imaging system for providing stereoscopic images, and particularly to a stereoscopic imaging system which permits observation of stereoscopic images with less fatigue, without producing an unnatural feeling to the observing eyes and without depending on the position of the observing eyes.

Among many factors which determine whether a person gets a stereoscopic view are the perception of the positional difference of the images in the two eyes due to the difference in the position of the left and right eyes, i.e. the binocular parallax, and the convergence-divergence movements of the eyes, i.e. slightly moving the eyes closer to each other and away from each other when viewing an object. A stereoscopic (three-dimensional) television system has been developed which provides stereoscopic images by generating the above-mentioned factors by means of two television cameras and provides the eyes with the images separately, thereby giving the viewer a perception of viewing the stereoscopic object. As means for providing a person with the images, there are a method in which two monitors are arranged to give separate images to each eye, and a method by which the left and right images are superimposed on one monitor and the images are separated by polarization of light or by an electronic shutter. FIGS. 1A, 1B and 1C show an example in which one monitor is used. In FIG. 1A, the left camera 1 and the right camera 2 result in images in which there is a binocular parallax. A field change-over signal processing unit 3 produces a synthesized video signal 4 made by alternately arranging frames L with frames R from the left and right camera heads 1 and 2. An A/D converter 5 converts this video signal into a digital signal which is stored in a frame memory 6, and a frame number converter 7 re-arranges the digital signal as a video signal 8 provided at a speed twice as fast as before. A D/A converter 9 converts this video signal 8 (FIG. 1B) in digital form into analog form, and shows the analog video signal on a twice-high-speed scanning monitor 10. Liquid crystal glasses 11 open and close liquid crystal shutters synchronized with the frames alternately shown on the twice-high-speed scanning monitor 10 in response to shutter signals 12 and 13 (FIG. 1C) synchronized with the frames produced by the frame number converter 7. Therefore, the left eye sees only the left frames L and the right eye sees only the right frames R. Owing to the effect of the binocular parallax, a person can perceive a stereoscopic image. A method is possible which, instead of the liquid crystal shutters, uses polarized light shutters, placed in front of the monitor screen or a projection lens of a video projector, operates the polarized light shutters by turns in synchronism with the left and right frames, and a person can separate the left and right images and obtain a stereoscopic image by wearing polarizing glasses using polarizing lenses, the polarizing directions of which differ between the left and right lenses.

Conventional stereoscopic vision technoligies are discussed in detail at pages 205 to 223 of Nikkei Electronics No. 444 (Apr. 4, 1988) and at pages 1 to 31 of Seimitsu Kogaku bulletin (the Journal of the Japan Society of Precision Engineering), 54/2/1988.

In the meantime, the relative position of the two camera heads 1, 2 is set in the following two ways (FIGS. 2 and 6). One method is that, as shown in FIG. 2, the two camera heads 1, 2 are arranged with their optical axes oriented in parallel. If an object, from which iamges are obtained is located in front of the two parallel camera heads 1, 2, the images are formed on image-forming planes 17, 18 by lenses 15, 16. In FIG. 2, the sizes and directions of images l and r on the image-forming planes are indicated by leader lines.

The two images l and r are displayed alternately on the monitor screen 19 as shown in FIG. 3, and the images are perceived by a person's eyes 20, 21. The left eye views the image 1 seen from the left hand side, while the right eye views the image r seen from the right hand side. As a result, a synthesized image 22 that can be seen by the binocular parallax is located in front of the monitor screen 19. In FIG. 2, if the object 14 is moved along the intermediate axis between the two camera heads 1, 2 to a point at infinity, the images of the object are formed at the central points of the left and right image-forming planes 17, 18. When these images are shown on the monitor screen 19 of FIG. 3, the point at infinity is located at the center of the monitor screen 19. When the object at the infinite-point moves to left or right, since the rays of light from the object are parallel rays, difference in parallax does not occur between the images l and r. Therefore, the points at infinity are distributed on the monitor screen 19, and normally a stereoscopic image of an object not present at a point at infinity is formed in front of the monitor screen 19. The area between the parallel optical axes 23, 24 of the two camera heads 1, 2 in FIG. 2 corresponds to the area between the optical axes 25, 26 of the eyes in FIG. 3. Therefore, the actual space is represented in condensed form in front of the monitor screen 19, and the breadth is also condensed. In consequence, the images are distorted, so that a stereoscopic image cannot be represented correctly. If various lengths are denoted by symbols shown in FIG. 4, positions k and m of the point p (x,y) on the image-forming planes are expressed by the following equations.

$$k = \frac{d(b/2 + x)}{y} \quad (1)$$

$$m = \frac{d(b/2 - x)}{y} \quad (2)$$

where b is the distance between the centers of the image-forming planes 17, 18, d is the distance from each of the lens centers to the image-forming planes, and s is the size of the image-forming planes. As shown in FIG. 5, if the size of the monitor screen is denoted by S, the distance from the eyes of the observer to the monitor screen by D and the space between the eyes by E, the position of a synthesized stereoscopic image P(X,Y) is expressed as follows. The positions K, M of the left and right rather than the screen size are first shown.

$$K = \frac{Sk}{s} = \frac{Sd(b/2 + x)}{sy} \quad (3)$$

$$M = \frac{Sm}{s} = \frac{Sd(b/2 - x)}{sy} \quad (4)$$

Therefore, the position of P(X,Y) is given as:

$$X = \frac{(K-M)}{2} \cdot \frac{E}{(M+K+E)} \tag{5}$$
$$= \frac{SdE\, x}{Sdb + sEy}$$

$$Y = D \cdot \frac{E}{(M+K+E)} \tag{6}$$
$$= \frac{DEs\, y}{Sdb + syE}$$

From Eq. (5), it is understood that owing to the effect of the value of y, X comes closer to zero as y approaches infinity. It is obvious from Eq. (6) that as y approaches infinity, Y comes closer to A. From Eqs. (5), (6), it follows that the actual point p (x,y) is deformed and reappears at the point P(X,Y) of the stereoscopic image, so that a natural feeling of three dimensions cannot be obtained.

$$\left[ \sqrt{a^2 + b^2/4} - \frac{a\left(a - y - \frac{(b/2)x}{a}\right)}{\sqrt{a^2 + b^2/4}} \right]$$
$$= \frac{x(a^2 + b^2/4) + (b/2)\{a^2 - ay - (b/2)x\}}{a\sqrt{a^2 + b^2/4}} \times \frac{d\sqrt{a^2 + b^2/4}}{b^2/4 + ay + (b/2)x}$$
$$= \frac{d\{ax - (b/2)y + a(b/2)\}}{ay + (b/2)x + (b/2)^2}$$

Likewise, from FIG. 8, $$m = \left\{ x - (a-y)\frac{b/2}{a} \right\} \frac{a}{\sqrt{a^2 + b^2/4}}\, xd \div \tag{8}$$
$$\left[ \sqrt{a^2 + b^2/4} - \frac{(a-y)\sqrt{a^2 + b^2/4}}{a} - \frac{(b/2)\left\{ x - (a-y)\frac{b/2}{a} \right\}}{\sqrt{a^2 + b^2/4}} \right]$$
$$= \frac{ad\{ax - (a-y)(b/2)\}}{a(a^2 + b^2/4) - (a-y)(a^2 + b^2/4) - (b/2)\{ax - (a-y)(b/2)\}}$$
$$= \frac{d\{(b/2)y + ax - a(b/2)\}}{ay - (b/2)x + (b/2)^2}$$

The relation between the monitor screen 19, on which these demensions are shown, and the eyes 20, 21 is shown in FIG. 5 as with the above case. Therefore, $$K = \frac{Sk}{s} \tag{9}$$
$$M = \frac{Sm}{s}$$
$$X = \frac{(K-M)E}{2(M+K+E)}$$
$$= \frac{S(k-m)E}{2\{S(m+k) + sE\}}$$
$$= \frac{2dES\left[ a\left(\frac{b}{2}\right)^3 + \left(\frac{b}{2}\right)\left(a^2 - \left(\frac{b}{2}\right)^2 y - a\left(\frac{b}{2}\right)(x^2 + y^2)\right) \right]}{4dS\left\{ a^2 + \left(\frac{b}{2}\right)^2 \right\}xy + sE\left\{ \left(\frac{b}{2}\right)^4 + 2a\left(\frac{b}{2}\right)^2 y + a^2y^2 - \left(\frac{b}{2}\right)^2 x^2 \right\}}$$

$$Y = \frac{DE}{(M+K+E)} \tag{10}$$
$$= \frac{DES}{S(m+k) + sE}$$
$$= \frac{DEs\left\{ \left(\frac{b}{2}\right)^4 + 2a\left(\frac{b}{2}\right)^2 y + a^2y^2 - \left(\frac{b}{2}\right)^2 x^2 \right\}}{2dS\left\{ a^2 + \left(\frac{b}{2}\right)^2 \right\}xy + sE\left\{ \left(\frac{b}{2}\right)^4 + 2a\left(\frac{b}{2}\right)^2 y + a^2y^2 - \left(\frac{b}{2}\right)^2 x^2 \right\}}$$

Another method of setting the relative position of the camera heads 1, 2 is to converge the optical axes of the cameras as shown in FIG. 6. The image obtained by this method is expressed by using the arrangements in FIGS. 7 and 8. The positions k and m of the point p(x,y) on the image-forming planes are expressed as follows.

$$k = \left[ \frac{x\sqrt{a^2 + b^2/4}}{a} + \frac{(b/2)\{a^2 - ay - (b/2)x\}}{a\sqrt{a^2 + b^2/4}} \right] d \div \tag{7}$$

In consequence, both X and Y, subject to the effect of x and y, are not in a simple proportional relationship. Therefore, the images taken by the left and right camera heads 1, 2 have an image distortion in addition to a transverse difference between them caused by binocular parallax, thus posing difficulty in obtaining a stereoscopic image.

Furthermore, there is another problem. When an object is selected which is in a square shape as seen from the front, an image obtained on the image-forming plane 17 at the left is a trapezoid with the right side tapering down as shown in FIG. 9. On the other hand, the image obtained on the image-forming plane 18 at the right is a trapezoid with the left side tapering down. If these two images are shown superimposed on the monitor screen 19, an image with a binocular parallax results, with the corresponding vertical lines having different lengths. In this case, if the left sides of these squares are taken for example as shown in FIG. 10, the synthesized image 27 is not synthesized correctly because these two sides have different lengths in the vertical direction. To be more specific, it is unnatural to obtain a stereoscopic image by synthesizing images of different sizes into a whole image by the work of the brain, and if this is done, the observer will become fatigued.

SUMMARY OF THE INVENTION

According to a first aspect of this invention, in order to achieve the above object, in a stereoscopic image system by which it is possible to see a stereoscopic image by parallax by reproducing two kinds of images, between which images there is parallax and which were taken by two cameras, on a screen of image-reproducing means and observing the images by the observer in such a manner that the left and right eyes observe only the images taken by the corresponding cameras out of the images shown on the screen, a stereoscopic camera is constructed such that normals of the image-forming planes of the two cameras are arranged in parallel, that the distance between the optical centers of lenses of the two cameras is shorter than the distance between the centers of image-forming planes of said two cameras, that both the ratio of the distance which remains after subtraction of the lenses spacing from the image-forming planes spacing to the distance between the eyes of the observer and the ratio of the distance from the image-forming planes to the optical centers of the lenses to the distance from the observer to the screen are substantially equal to the ratio of the size of the images on the image-forming planes to the size of the image on the screen.

The operating principle of a stereoscopic image system of the above-mentioned construction will be described with reference to the accompanying drawings.

In FIG. 15, optical centers 28, 29 of lenses of the left and right camera heads are converged from the center lines of the image-forming planes 17, 18 so that straight lines connecting the center points of the image-forming planes 17, 18 and the optical centers 28, 29 of the lenses intersect each other on the y axis at a point which is a distance a in front of the lens plane. At this time, the values of k and m which define the position of the image of the point p (x,y) can be obtained as follows.

$$\frac{e/2 + x}{k + (b/2 - e/2)} = \frac{y}{d}$$

$$\frac{e/2 - x}{(b/2 - e/2) - m} = \frac{y}{d}$$

$$k = \frac{d}{y}(e/2 + x) - (b/2 - e/2) \quad (11)$$

$$m = \frac{d}{y}(x - e/2) + (b/2 - e/2) \quad (12)$$

If this image is synthesized as shown in FIG. 16, the positions K, M of the image on the monitor screen 19 are expressed as follows.

$$K = \frac{Sk}{s} \quad (13)$$
$$= \frac{S}{s}\left[\frac{d}{y}(x + e/2) - (b/2 - e/2)\right]$$

$$M = \frac{Sm}{s} \quad (14)$$
$$= \frac{S}{s}\left[\frac{d}{y}(x - e/2) + (b/2 - e/2)\right]$$

If the space between the eyes is denoted by E, the distance from the position of the eyes to the monitor screen 19 denoted by D, the position of a stereoscopic image P (X,Y) is obtained as:

$$X = \frac{E(K + M)}{2\{E + (K - M)\}} \quad (15)$$
$$= \frac{dESx}{edS + \{E_s - S(b - e)\}y}$$

$$Y = \frac{DE}{E + (K - M)} \quad (16)$$
$$= \frac{EDsy}{edS + \{E_s - S(b - e)\}y}$$

Various dimensions are determined so as to satisfy the following relation:

$$\frac{S}{s} = \frac{D}{d} = \frac{E}{(b - e)} = f \quad (17)$$

where $$e = \frac{ab}{a + d} \quad (18)$$

Thus, X and Y are given as:

$$X = \frac{dESx}{edS + \left\{E_s - S\left(\frac{s}{S}E\right)\right\}y} \quad (19)$$
$$= \frac{E}{e}x$$

$$Y = \frac{EDsy}{edS + \left\{E_s - S\left(\frac{s}{S}E\right)\right\}y} \quad (20)$$
$$= \frac{EDs}{edS}y$$
$$= \frac{E}{e}y$$

From the above results, it is clear that the position of the synthesized stereoscopic image P(X,Y) is in proportion to the position of the object p(x,y) and that an image without distortion can be reproduced. The proportional constant, $$\frac{E}{e}$$

which indicates the enlargement ratio of the space is determined by the ratio (D/a) between the distance D from the position of the observer to the monitor image plane and the distance a from the lens plane to the intersection of the optical axes of the two camera heads. Based on the above-mentioned supposition, the distance D from the human eyes to the monitor screen needs to be set at a value obtained by the following equation.

$$D = fd = \frac{S}{s} d \quad (21)$$

The space d between the camera heads needs to be set at a value obtained by the following equation.

$$e = \frac{E}{f} = \frac{ab}{a + d} \quad (22)$$

Therefore, $$b = \frac{s}{S} E + \frac{ab}{a} \quad (23)$$

The d is a value determined by the focal length of the lenses and by focus adjustment, but since the effect of focus adjustment is small, the value of d can be so set in design as to be determined by the focal length.

According to this method, a reproduced stereoscopic image is free from distortion, so that the unnaturalness due to the difference in the vertical length of images, described with reference to FIG. 10, does not occur. Let us suppose that an image is obtained of a quadrilateral present on a plane perpendicular to the optical axes of the camera heads. As shown in FIGS. 17, 18, the image-forming planes 17, 18 are parallel with the quadrilateral, so that the images on the image-forming planes 17, 18 are homologous quadrilaterals which are point-symmetrical with the quadrilateral in relation to the optical centers 28, 29 of the lenses. The ratio in size is determined by the ratio of the normal distances from the optical centers 28, 29 of the lenses to the respective quadrilaterals. The same lengths are set for the normal distances from the lens centers 28, 29 to the image-forming planes 17, 18 in the left and right camera heads. Therefore, quadrilaterals formed on the left and right image-forming planes 17, 18 are the same in size. As a result, the vertical sides of the two quadrilaterals are the same. Consequently, as shown in FIG. 19, in the stereoscopic image formed, the lengths of the vertical lines are identical, so that there is no unnaturalness in the image and the observer gets the impression of three dimensions (depth) in viewing the image.

When zoom lenses are used or the lenses are replaced with telephoto lenses, the value of d changes. In this case, as shown in FIG. 20, if d changes to d', the distance a from the optical centers of the lenses to the intersection of the optical axes of the camera heads changes to a'. At this time, $$a' = \frac{a}{d} d' \quad (24)$$

$$y' = y - (d' - d) \quad (25)$$

The following e' is made by substituting a and d in Eq. (22) by a' and d' by utilizing Eqs. (22) and (24).

$$e' = \frac{a'b'}{a' + d'} = \frac{\left(\frac{a}{d} d'\right)b}{\frac{a}{d} d' + d'} = \frac{ab}{a + d} = e \quad (26)$$

By setting $$\frac{D}{d'} = f \quad (27)$$

we have:

$$d' = \frac{f}{f} d \quad (28)$$

$$a' = \frac{f}{f} a \quad (29)$$

$$y' = y + d - d' = y + d\left(\frac{f - f}{f}\right) \quad (30)$$

Furthermore, x does not change.

Therefore, in Eqs. (19), (20), by substituting e, d, and y with e', d', and y', we can obtain:

$$X = \frac{E}{e'} x = \frac{E}{e} x \quad (31)$$

$$Y = \frac{E}{e} \{y - (d' - d)\} \quad (32)$$

Therefore, $$\frac{Y}{Y} = \frac{\frac{E}{e} \{y - (d' - d)\}}{\frac{E}{e} y} = \frac{y - (d' - d)}{y} \quad (33)$$

From the above results, we find that when the lenses are replaced with lenses with long focal length, the value of X remains unchanged, while the value of Y comes closer to the object by the extended amount of the focal length, and is condensed in inverse proportion to the focal length. As a result, the observer can see the object enlarged as if it were closer to him, but gets a reduced impression of depth.

According to a second aspect of this invention, in order to achieve the above object, the stereoscopic camera of this invention is constructed such that two television cameras are arranged with the normals of the image-forming planes thereof oriented in parallel, such that the stereoscopic camera is provided with a signal processing unit for processing signals so that the space between the centers of the two lenses is larger than the space between the image-forming points corresponding to the image centers of the two image-forming planes, and such that the lines connecting the lens centers with the image-forming points corresponding to the image centers are arranged to intersect each other in front of the stereoscopic camera.

As shown in FIG. 23, two television cameras are arranged in parallel, the points 136, 137, at which straight lines connecting a point which is the distance an away in front of the two television cameras with the lens centers of the television cameras intersect the image-forming planes 118, 119, are defined as the center points of the images. An image is reproduced so that the image center points 136, 137 coincide with the center point 138 of the monitor screen 120. The position of the reproduced stereoscopic image P(X,Y) of the point p (x,y) can be obtained as shown below. The space b between the image center points can be found by geometrical relations shown in FIG. 23.

$$\frac{b/2 - e/2}{d} = \frac{e/2}{a} \tag{123}$$

Therefore, $$b = \frac{a + d}{a} e \tag{124}$$

The positions mL and mR of the images are:

$$\frac{mL}{d} = \frac{(e/2 + x) - \frac{y}{a}(e/2)}{y} \tag{125}$$

$$\frac{mR}{d} = \frac{(e/2 + x) - \left(e - \frac{y}{a}(e/2)\right)}{y} \tag{126}$$

From the sizes s of the image-forming planes and the positions $M_L$ and $M_R$ of the image on the monitor screen 120 are given by $$M_L = \frac{S}{s} m_L \tag{127}$$

$$M_R = \frac{S}{s} m_R \tag{128}$$

The position of the stereoscopic image P(X,Y) is obtained as:

$$\frac{D}{Y} = \frac{(M_L + M_R)/2}{X} \tag{129}$$

$$\frac{Y - D}{Y} = \frac{M_R - M_L}{E} \tag{130}$$

From Eq. (130), $$Y = \frac{ED}{(M_L - M_R) + E} \tag{131}$$

From Eqs. (129), (131), $$X = \frac{E(M_L + M_R)}{2(M_L - M_R + E)} \tag{132}$$

From Eqs. (125), (126), $$m_L + m_R = \frac{d}{y}\{2(e/2 + x) - e\} \tag{133}$$

$$= \frac{2dx}{y}$$

$$m_L - m_R = \frac{d}{y}\left(e - \frac{2y}{a}(e/2)\right) \tag{134}$$

$$= \frac{d}{y} \cdot \frac{e(a - y)}{a}$$

From Eqs. (127), (128), (133), (134), $$M_L + M_R = \frac{2dS}{s} \cdot \frac{x}{y} \tag{135}$$

$$M_L - M_R = \frac{edS}{as} \cdot \frac{(a - y)}{y} \tag{136}$$

From Eqs. (132), (135), (136), $$X = \frac{2dESx/sy}{2\{edS(a - y)/asy + E\}} \tag{137}$$

$$= \frac{adES}{aedS + (Eas - edS)y}$$

Let us here suppose that the ratio between the distance a from the television camera lenses to the intersection of the optical axes and the distance d from the lenses to the image-forming planes is equal to the product of the ratio between the camera spacing e and the distance of the observer's eyes and the ratio between the monitor screen size S and the image-forming plane size s.

$$\frac{a}{d} = \frac{e}{E} \cdot \frac{S}{s} \tag{138}$$

Substituting Eq. (138) into Eq. (137), we have $$X = \frac{E}{e} x \tag{139}$$

From Eqs. (131), (136), $$Y = \frac{ED}{\frac{edS}{as} \cdot \frac{(a - y)}{y} + E} \tag{140}$$

$$= \frac{asEDy}{aedS + (asE - edS)y}$$

Substituting Eq. (138) into Eq. (140), $$Y = \frac{Ds}{dS} \frac{E}{e} y \tag{141}$$

Suppose here that the ratio between the distance D from the observer to the monitor screen and the distance d from the lenses to the image-forming planes is equal to the ratio between the size S of the monitor screen and the size s of the image-forming planes, as shown below.

$$\frac{D}{d} = \frac{S}{s} \tag{142}$$

Substituting Eq. (142) into Eq. (141), $$Y = \frac{E}{e} y \tag{143}$$

The reproduced stereoscopic image P(X,Y) is represented E/e times larger than the original point p, and is perfectly isotropic. Therefore, an accurate stereoscopic image without distortion can be obtained. If the space e between the cameras is made equal to the space between the eyes of the observer, the reproduced stereoscopic image can represents the environment in front of the stereoscopic camera accurately as it is. If a stereoscopic camera with a small camera spacing e is used while maintaining the conditions expressed by Eqs. (138), (139), a reproduced image can be enlarged.

Conversely, if a stereoscopic camera with a large spacing e is used, the reproduced stereoscopic image is reduced in size. At this time, the linearity is maintained.

If E/e is defined as the stereoscopic image enlargement ratio $v$.

$$v = \frac{E}{e} \quad (144)$$

From Eqs. (138), (142), and (144), $$a = D/v \quad (145)$$

Therefore, from Eqs. (144), (145), two conditions for obtaining a stereoscopic image without distortion can be expressed as follows.

Condition 1

The observer observes at a position away from the monitor screen by the distance D obtained by multiplying the distance from the lens centers of the cameras to the image-forming planes by the ratio of the monitor screen size S to the image-forming plane size s.

Condition 2

The distance a from the intersection of the optical axes of the two cameras to the line connecting the optical centers of the camera lenses needs to be set to be equal to a product of the distance D from the observer to the monitor screen and the ratio between the camera spacing e and the observer's binocular space E, that is to say, the reciprocal of the stereoscopic image enlargement ratio $v$.

BRIEF DESCRIPTION OF THE DRAWINGS

FIG. 2 shows the imaging optical system;

FIG. 3 shows the observation optical system of reproduced images;

FIG. 4 shows the geometric arrangement of that imaging optical system;

FIG. 5 shows the geometric arrangement of that observation optical system;

FIG. 6 shows the imaging optical system;

FIGS. 7 and 8 show the geometric arrangements of the imaging optical system of FIG. 6;

FIGS. 9 and 10 are diagrams useful for explaining the problems of the second optical system;

FIGS. 11 to 20 are diagrams showing an embodiment of this invention;

FIGS. 11 to 14 are perspective and front views showing the construction of the camera;

FIGS. 15 to 20 are diagrams showing the geometric arrangement of the imaging optical system;

FIG. 16 is a geometric arrangement diagram of the observation optical system of reproduced images;

FIGS. 17 to 20 are diagrams useful for explaining the effect of that embodiment;

FIGS. 21 and 24 are diagrams for explaining a video signal and its operation;

FIGS. 22 and 23 are diagrams showing the geometric arrangements of the imaging system and observation system according to this other embodiment;

FIG. 25 is a block diagram showing the circuit configuration;

FIG. 26 is an operation waveform diagram;

FIG. 27 is a diagram for explaining a video signal and its operation;

FIG. 28 is a block diagram showing the circuit configuration;

FIG. 29 is an operation waveform diagram;

FIG. 30 is a block diagram showing the circuit configuration;

FIG. 31 is an operation waveform diagram;

FIGS. 32 to 39 are diagrams yet another embodiment of this invention;

FIG. 32 is a block diagram showing the circuit configuration;

FIG. 33 is a front view showing the moving mechanism of the imaging optical system;

FIGS. 33 to 39 are diagrams showing the geometric optical arrangement of this yet another embodiment;

FIG. 40 is a perspective view for explaining the positional relation between the video monitor screen and the observer;

FIG. 41 is a perspective view showing the arrangement of the imaging system;

FIGS. 42 and 43 are a front view and a plan view showing the mechanism for moving the imaging optical system; and FIG. 44 is a block circuit diagram showing the circuit configuration.

DESCRIPTION OF THE PREFERRED EMBODIMENTS

Figure 1A:
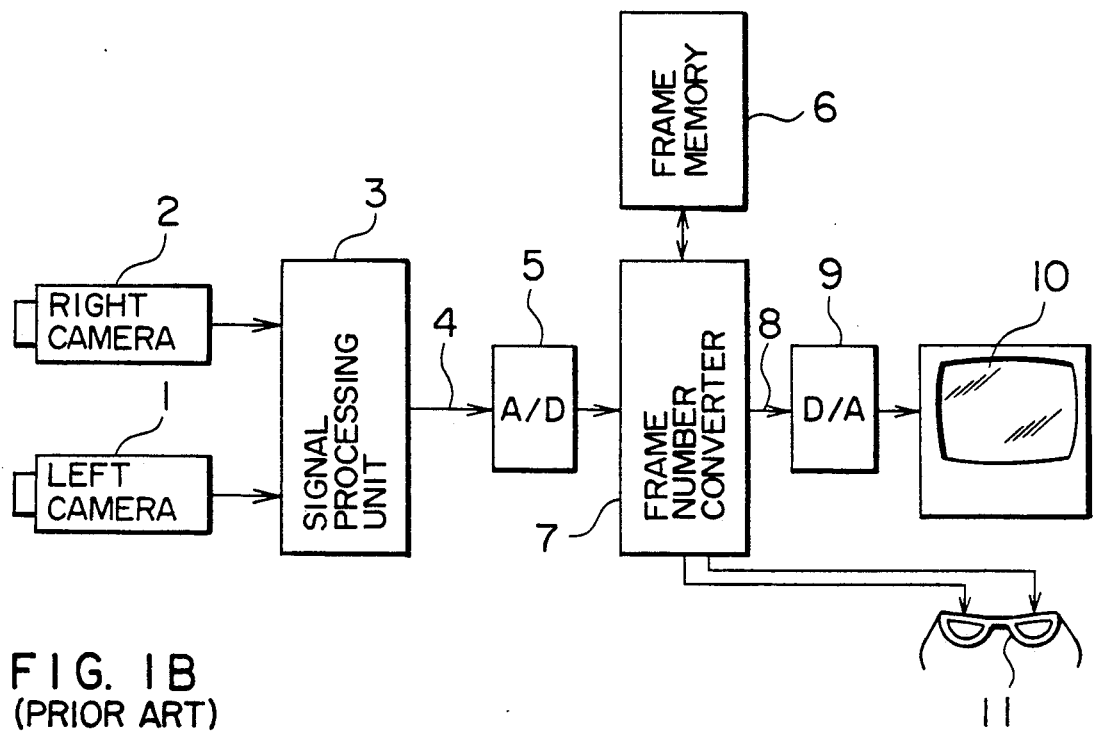
FIGS. 1A, 1B, and 1C are respectively a block circuit diagram, a video signal waveform diagram and a shutter signal waveform diagram, which show an example of a conventional stereoscopic image system.
Figure 1B:
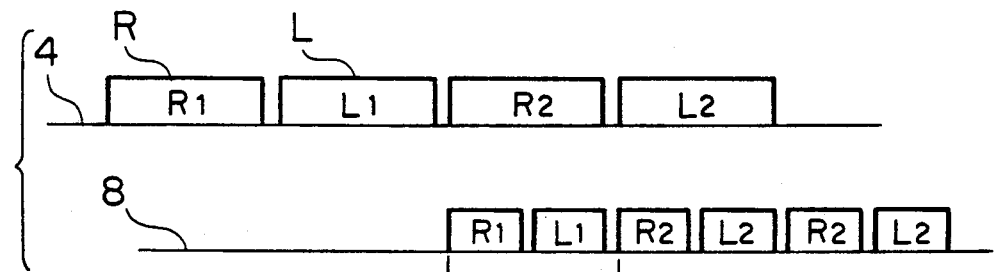
Figure 1C:
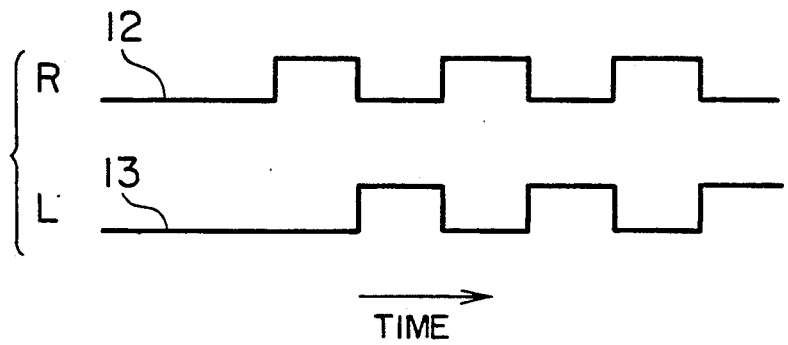
Figure 2:
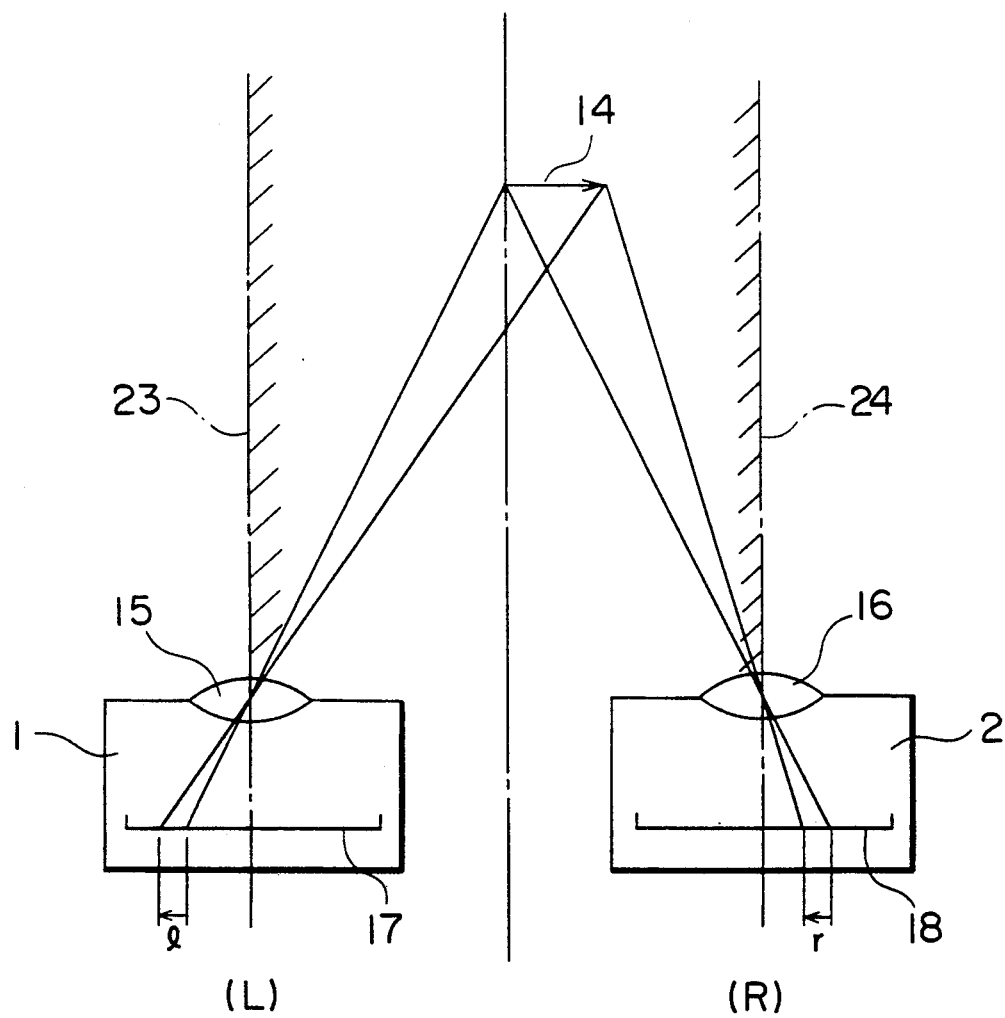
FIGS. 2 to 5 are diagrams showing a first optical system of a conventional stereoscopic image apparatus.
Figure 3:
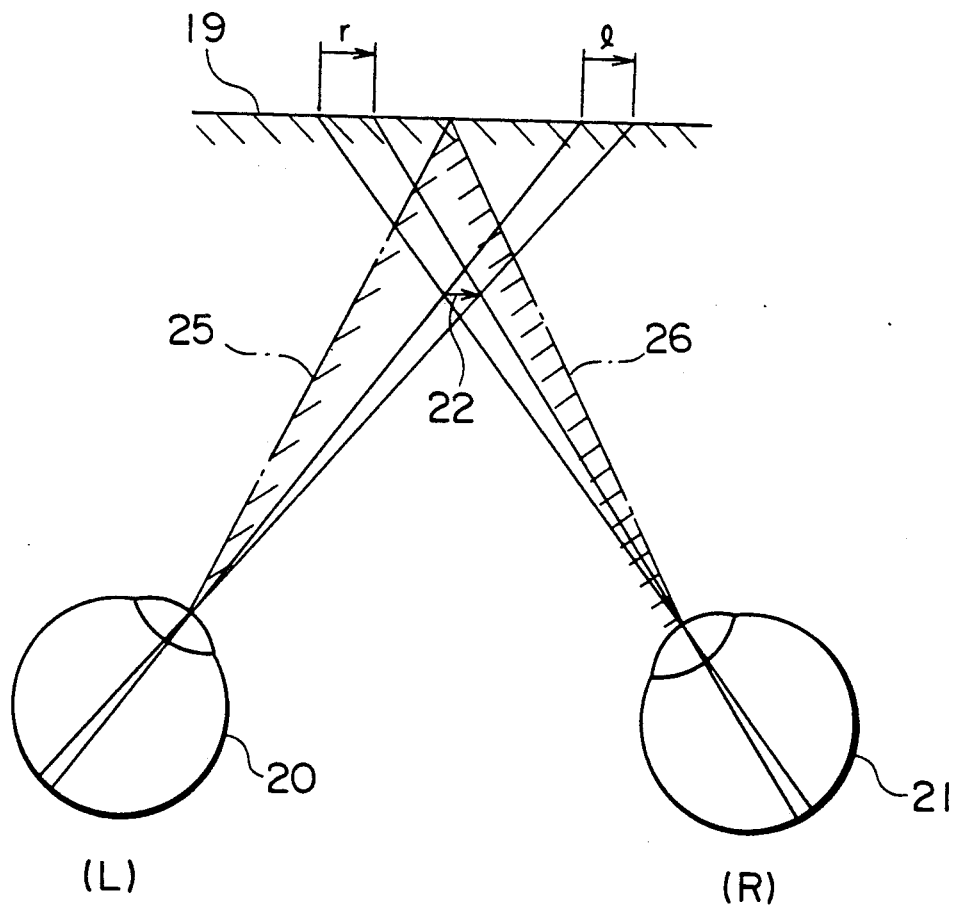
Figure 4:
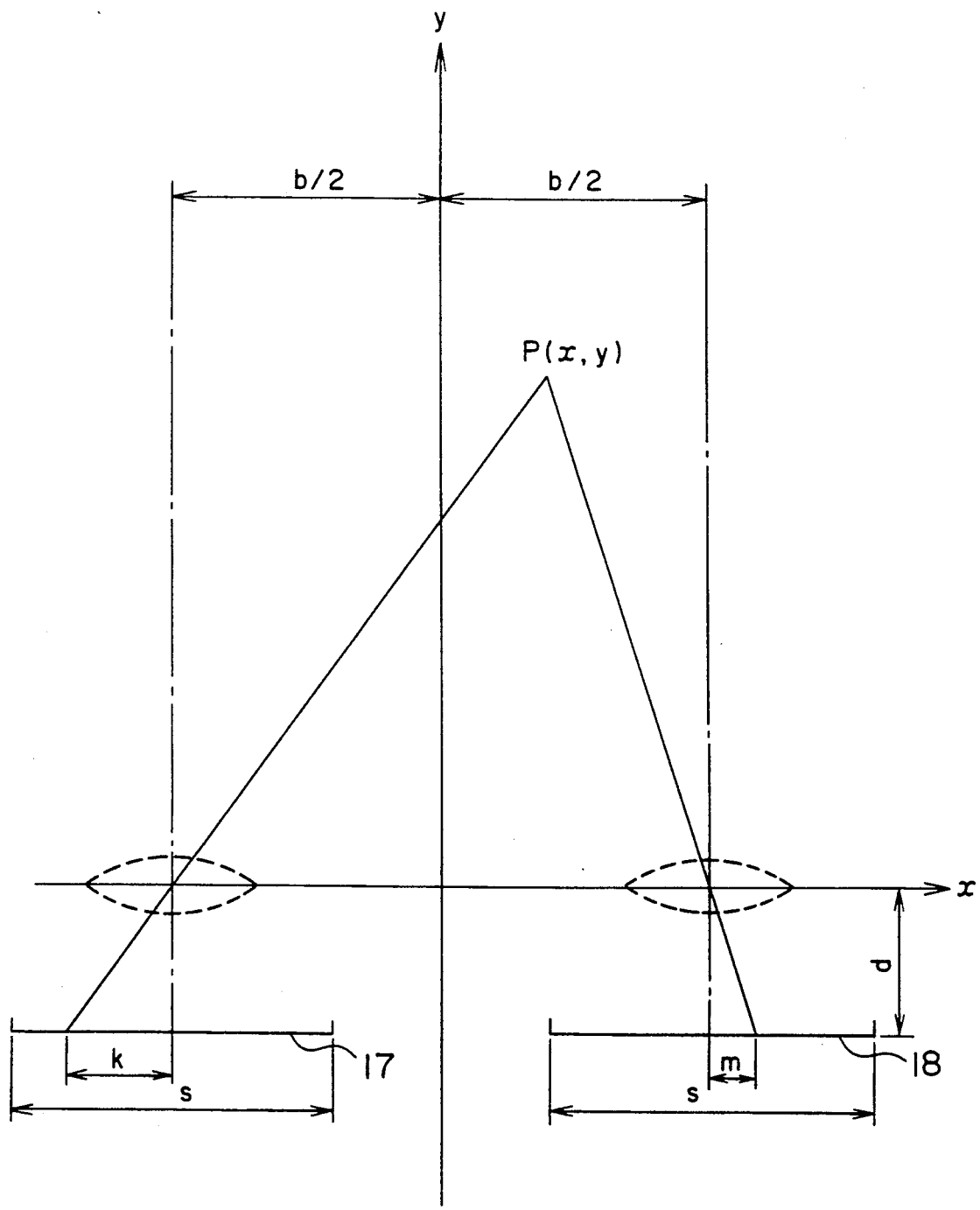
Figure 5:
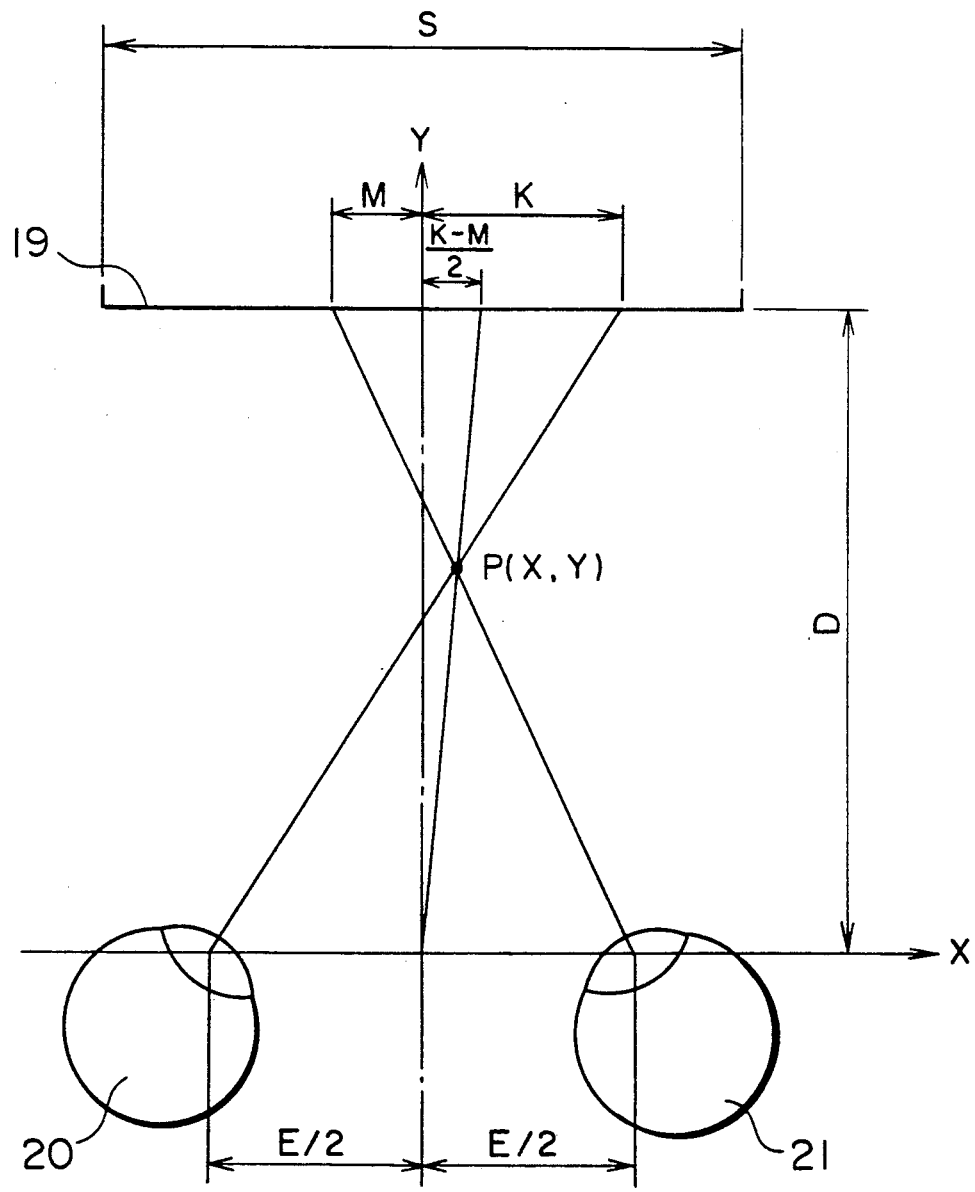
Figure 6:
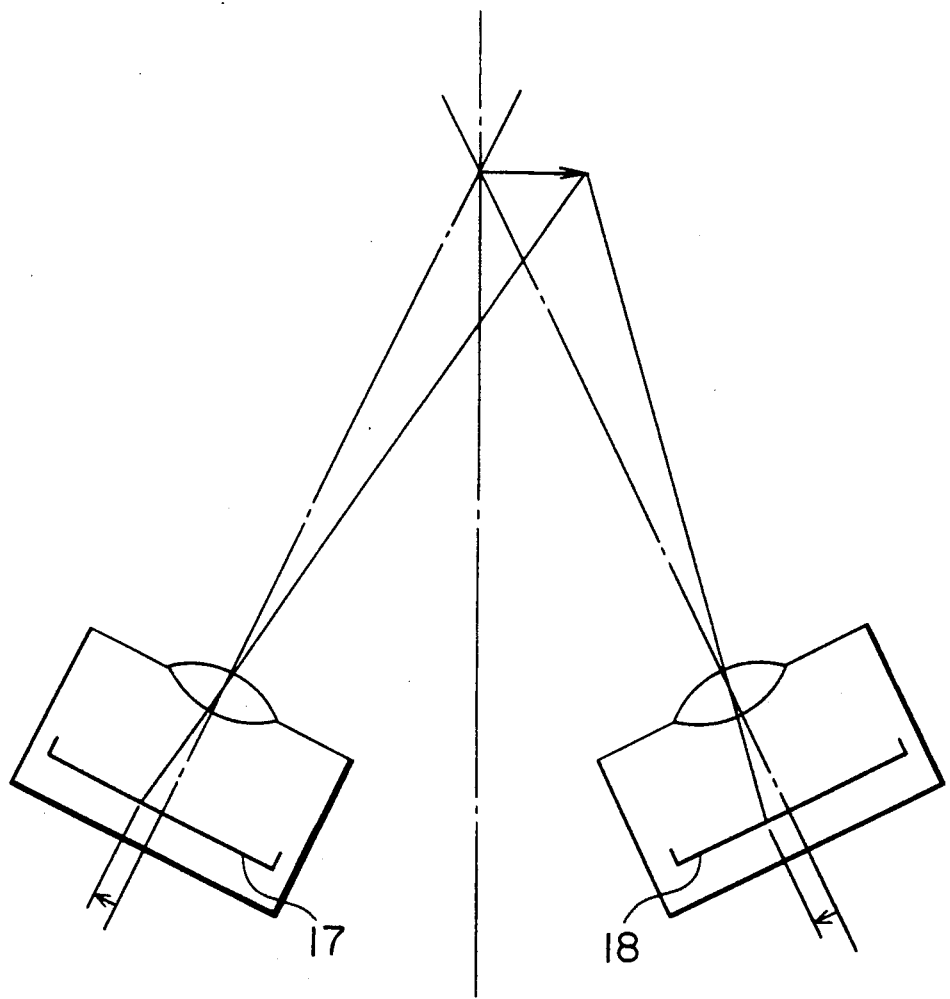
FIGS. 6 to 10 are diagrams showing a second optical system of a conventional stereoscopic imaging apparatus.
Figure 7:
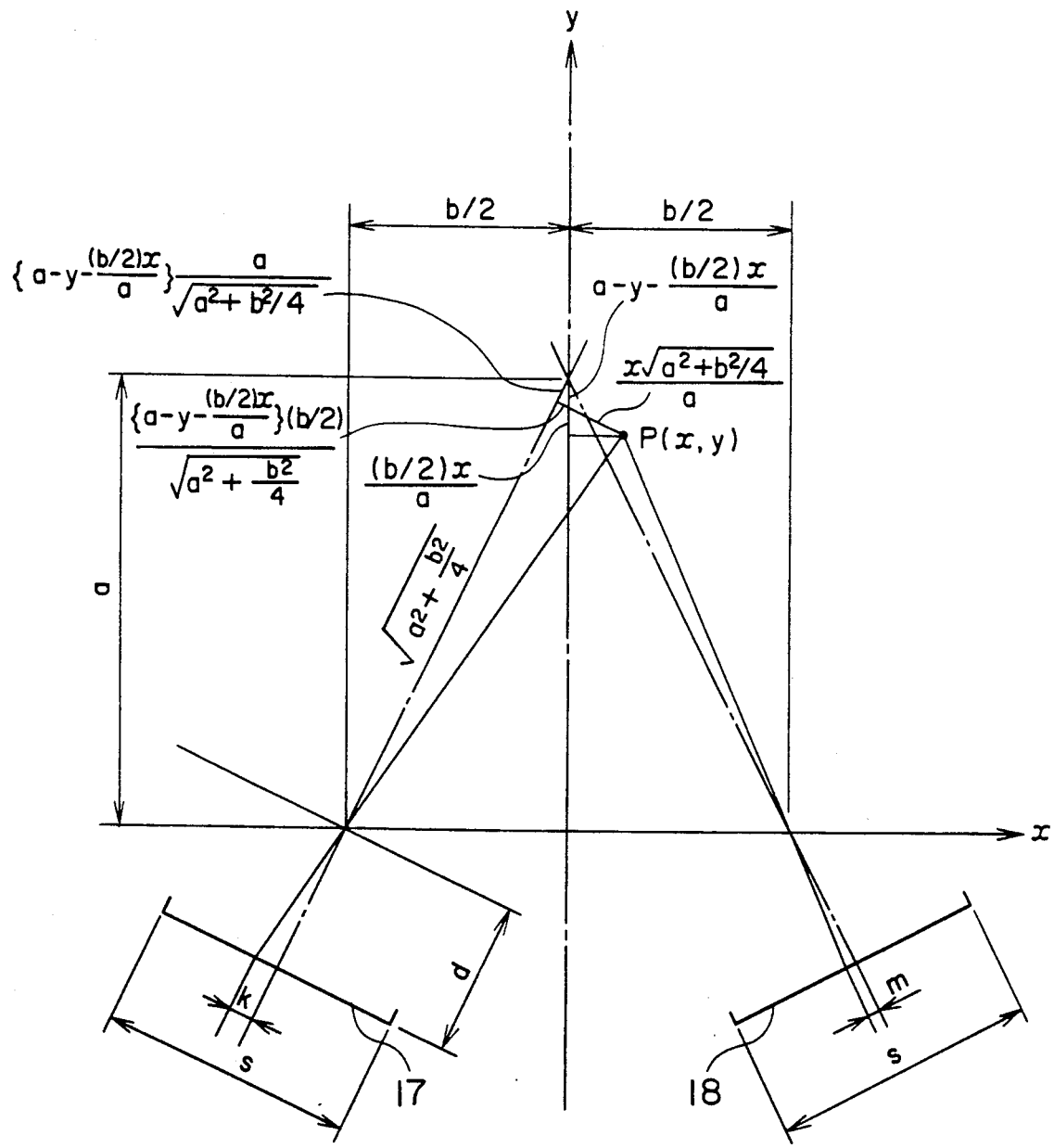
Figure 8:
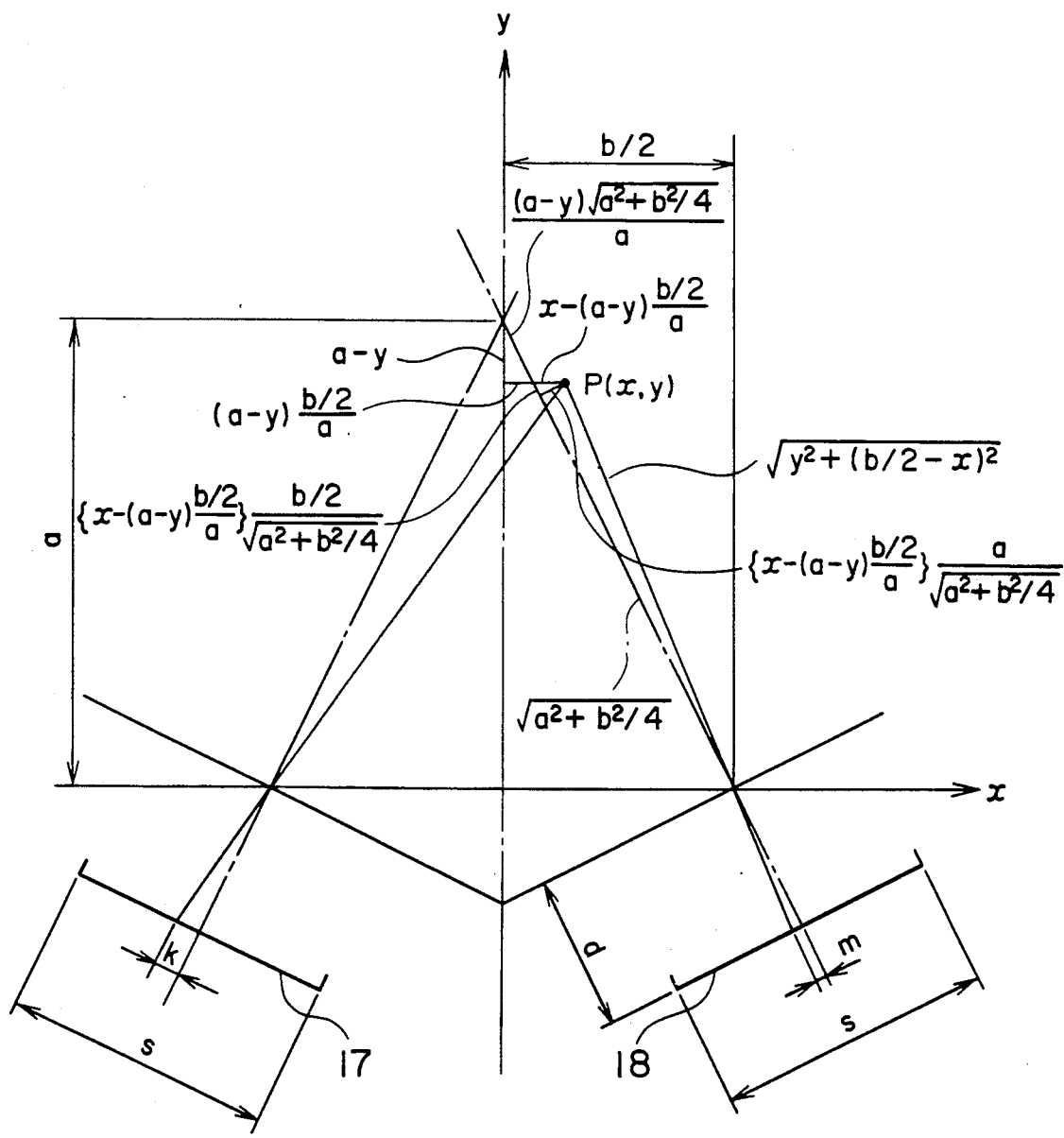
Figure 9:
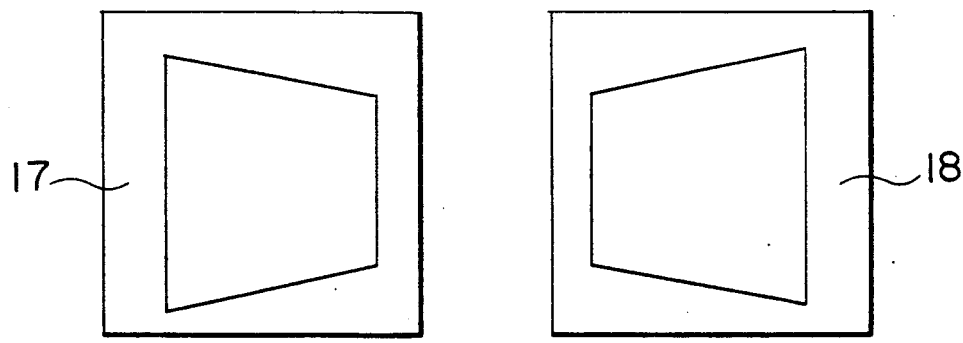
Figure 9:
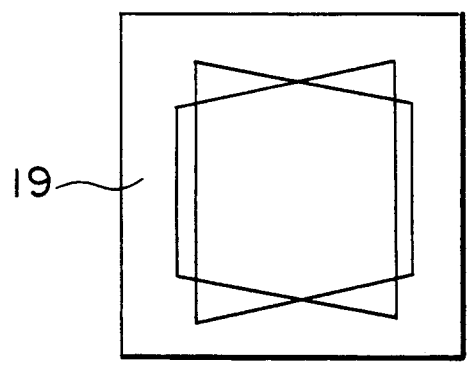
Figure 10:
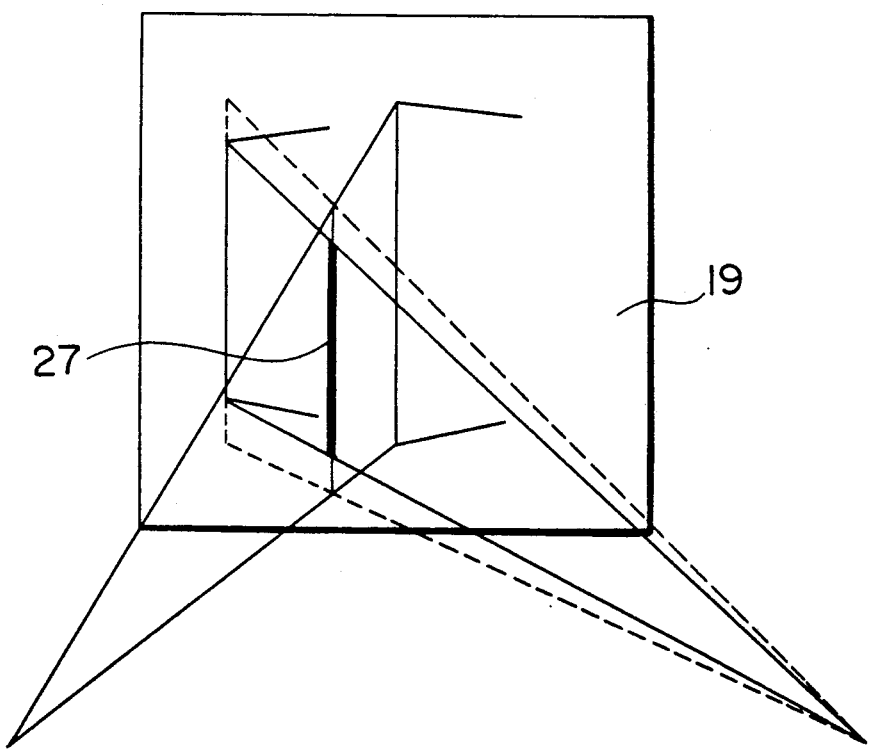

An embodiment according to said first aspect of this invention will be described with reference to the accompanying drawings.

Those parts of this embodiment which are identical with these of the prior art are designated by the same reference numerals, and description of such parts will be omitted.

Figure 11:
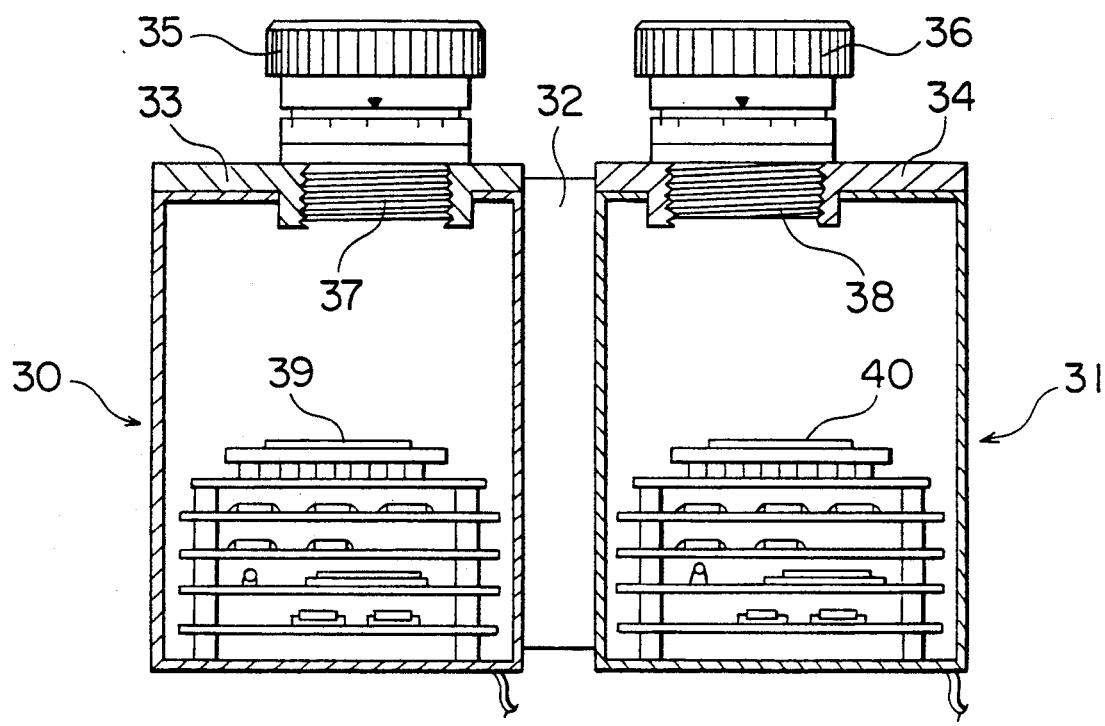
Figure 12:
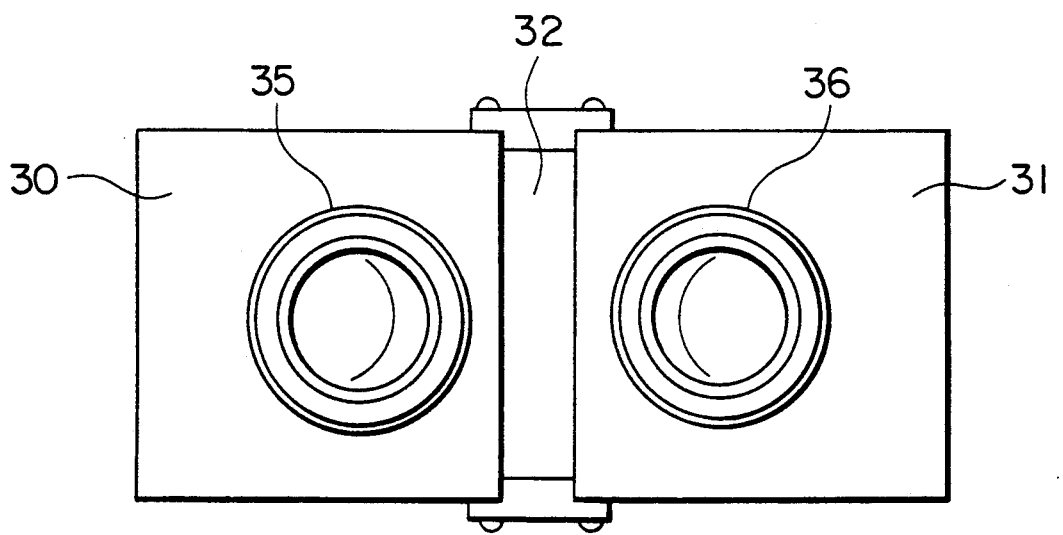

As shown in FIGS. 11 and 12, two television cameras 30, 31 are combined by a connecting member 32 into a single body and used as a stereoscopic camera. Mount members 33, 34 of television cameras 30, 31 have formed at their openings threads 37, 38 for mounting lens tubes 35, 36. By mounting the lens tubes 35, 36, images are formed on the image-forming elements 39, 40 in the television camera. It ought to be noted that the positions of the centers of the mounting threads are not on the axes of the image-forming elements 39, 40, but located shifted towards the connecting member 32.

Figure 13:
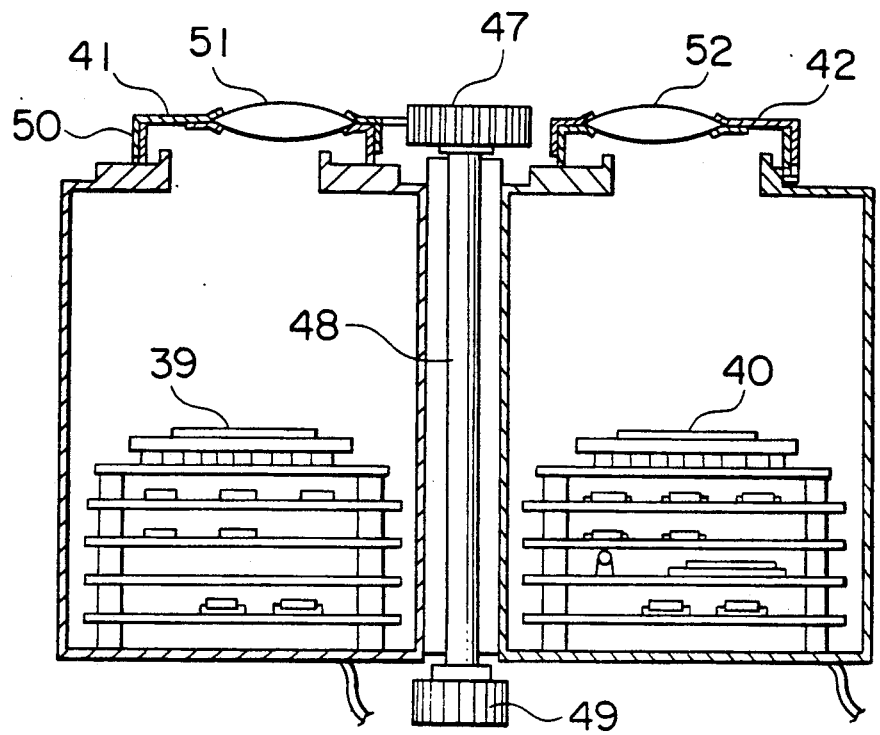
Figure 14:
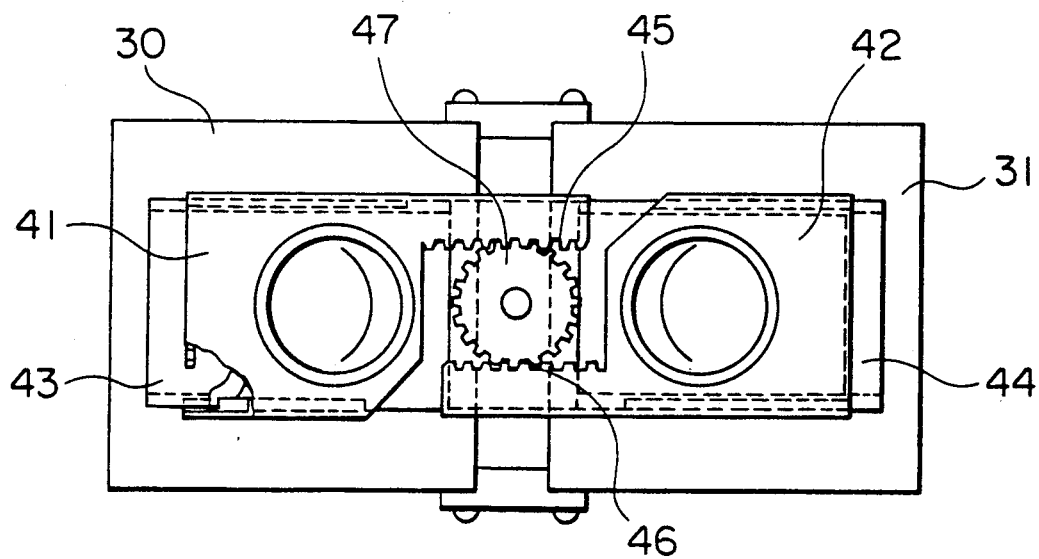
Figure 16:
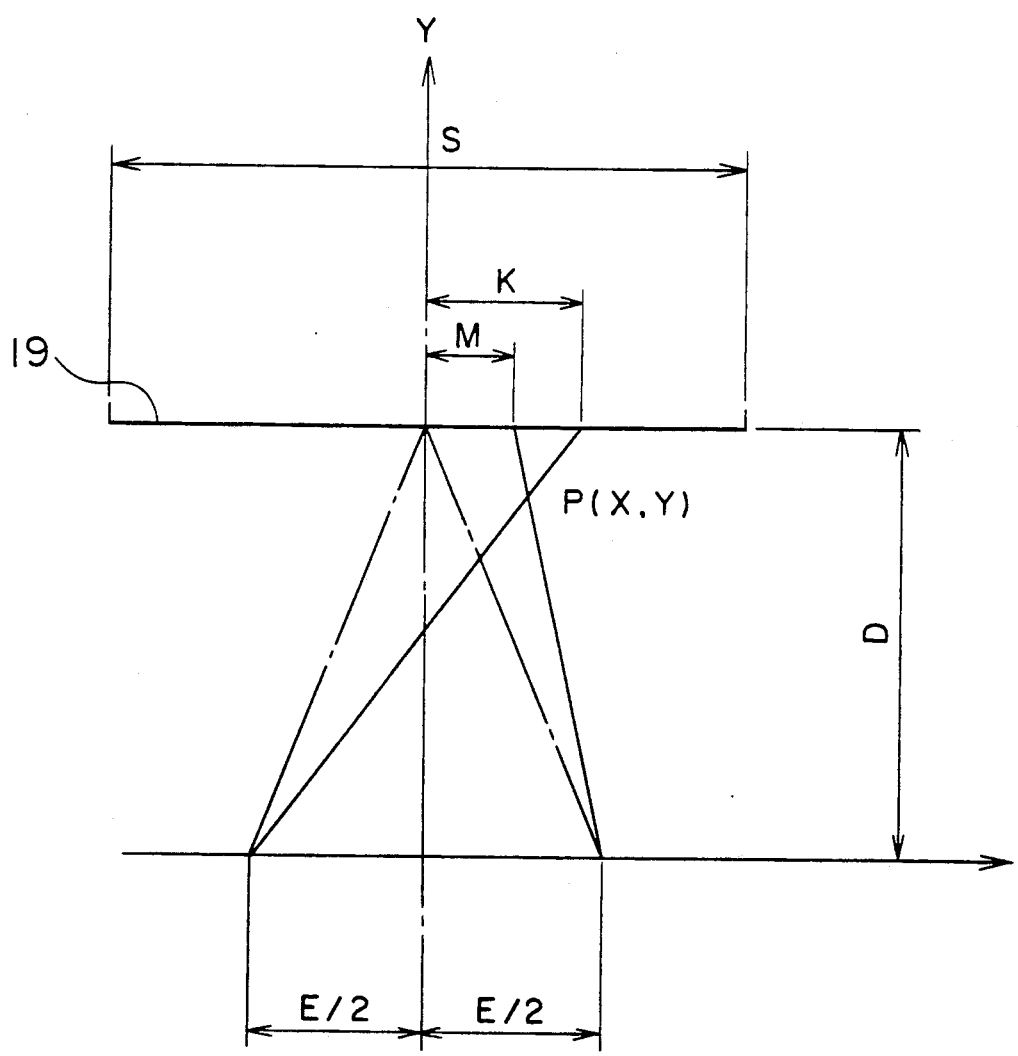
Figure 17:
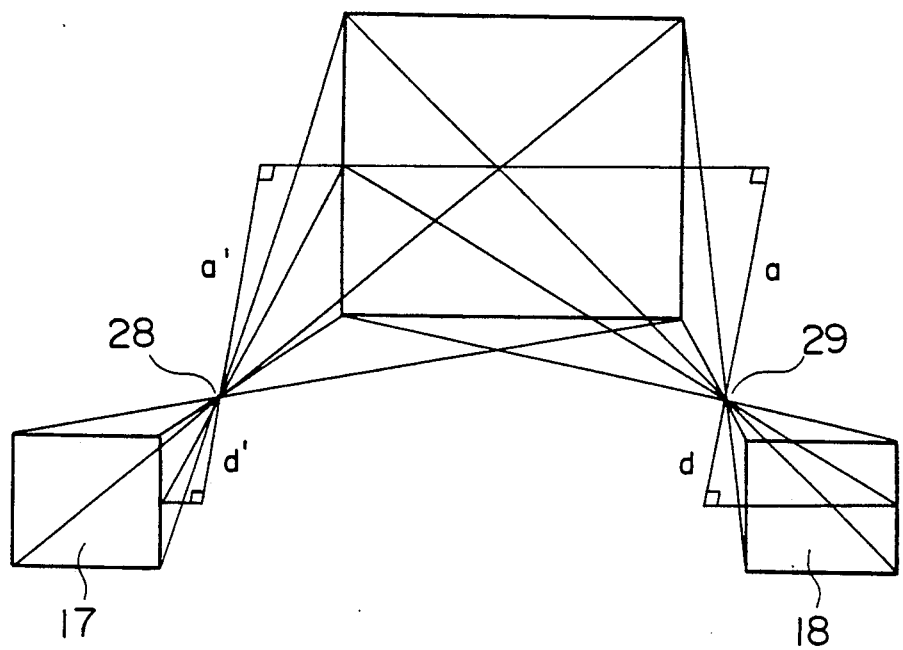
Figure 18:
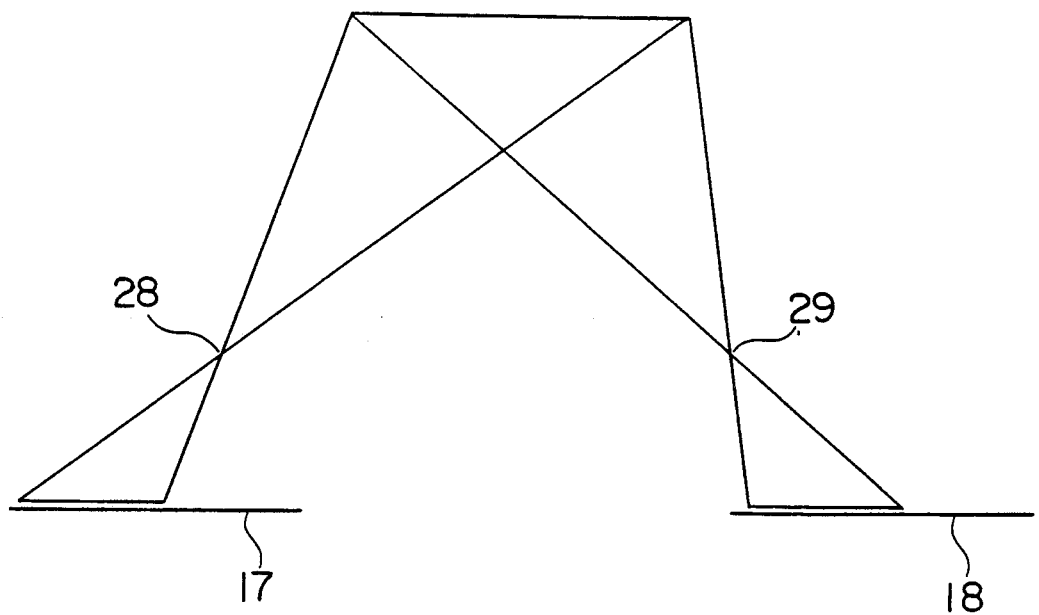
Figure 19:
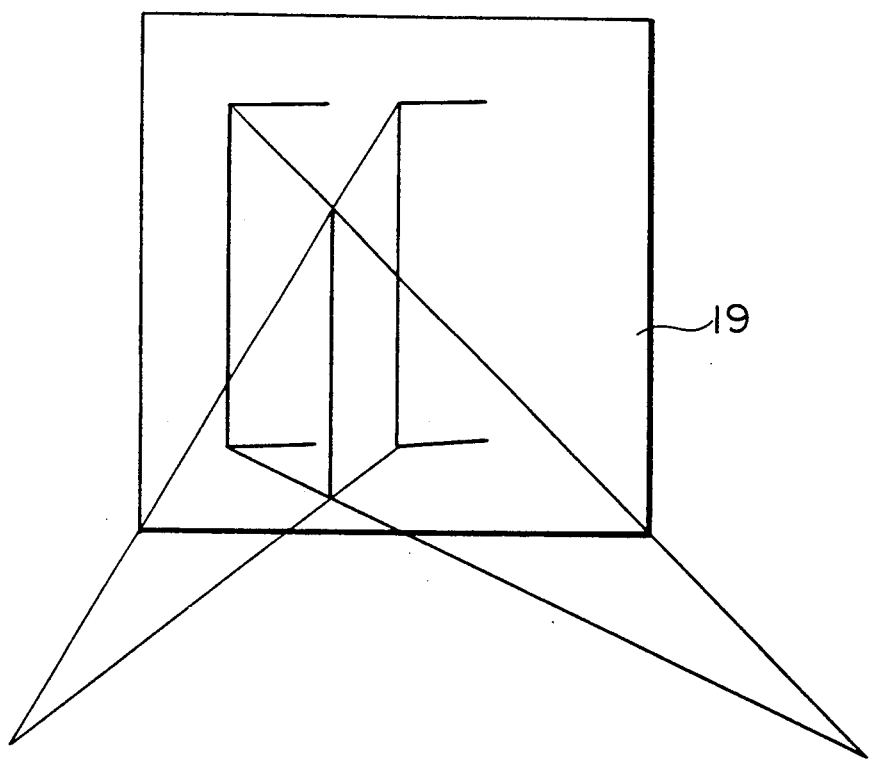
Figure 20:
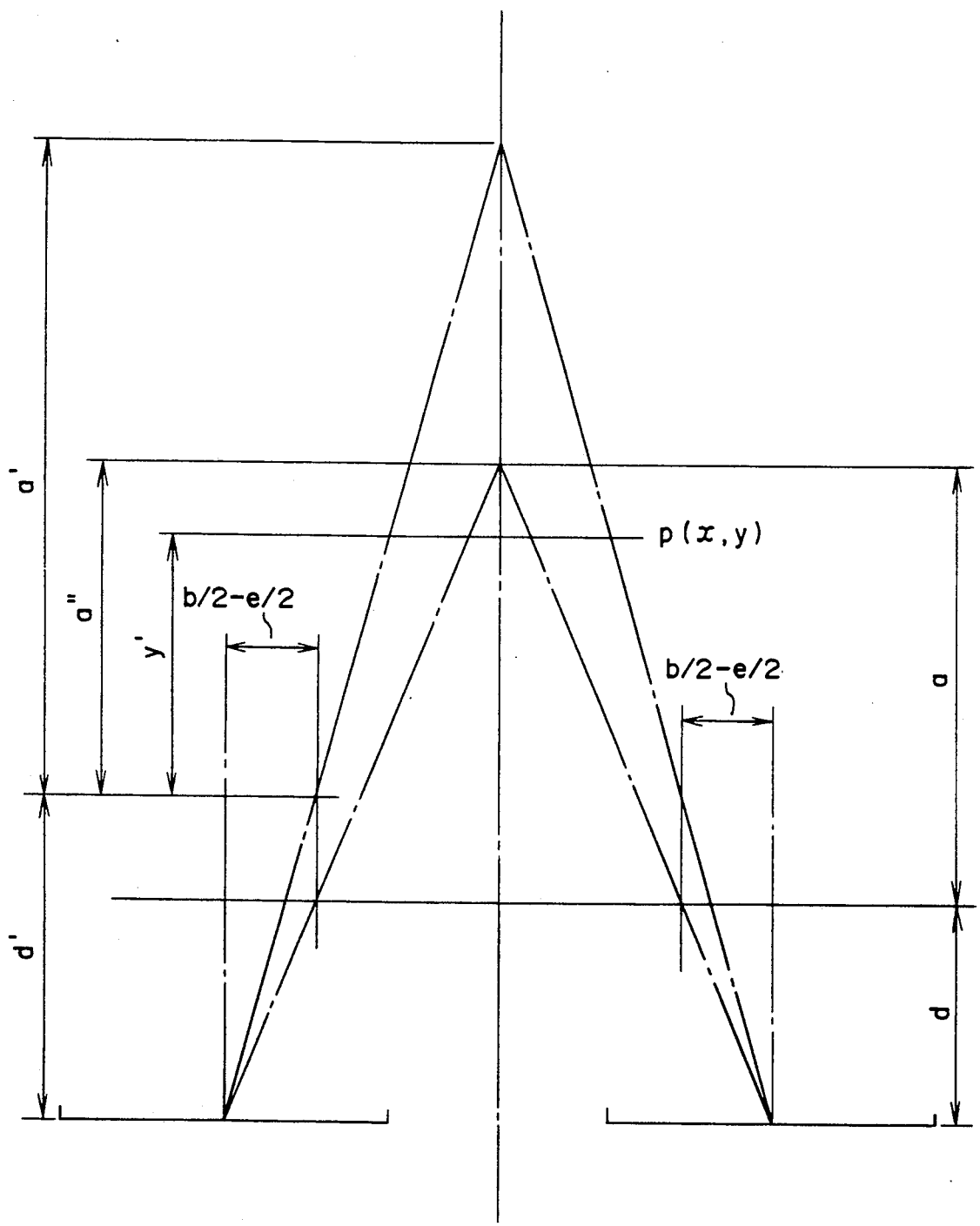

FIGS. 13 and 14 show another embodiment of this invention. In this embodiment, lens mounts 41, 42 are so constructed as to be slidable. More specifically, the lens mounts 41, 42 are each made by bending a thin plate, and the ends of the plate are bent towards the inside. The bent portions are fitted into grooves provided in the end plates 43, 44 of the television cameras, and are slidable. Rack gears 45, 46 are provided at part of the lens mounts 41, 42 and engage with a pinion 47. The pinion 47 is connected by a knob 49 with the intermediary of a shaft 48.

A shading material 50 is attached to the inside of the lens mounts 41, 42 to cut off external light. By turning the knob 49, the left and right lens mounts 41, 42 are caused to slide the same distance by the work of the pinion 47 and the racks 46, 47, so that the distance between the lenses can be changed easily. Therefore, if the distance between the observer and image-reproducing means changes, the adequate conditions can be obtained to produce a correct stereoscopic image by only correcting the distance between the lenses. In FIGS. 13, 14, single lenses are shown, but a combination of lenses may be used for the lenses 51, 52.

The stereoscopic camera of this embodiment can be used for video recording at theaters or remote control of a manipulator, etc. In addition, the stereoscopic camera, if made in a small size, will be effective in surgery using a TV.

As has been discussed, according to the first aspect of this invention, a natural stereoscopic vision without distortion can be obtained, so that the fatigue of the observer can be mitigated and he can continue observation for a long time. Furthermore, according to this invention, even when the position of the observer in relation to the image-reproducing means changes, the lens position can be adjusted so that the observer can get the impression of depth or three dimensions from a synthesized image, and the fatigue of the observer can be lessened.

An embodiment according to the second aspect of this invention referring to the accompanying drawings is now described.

Figure 21:
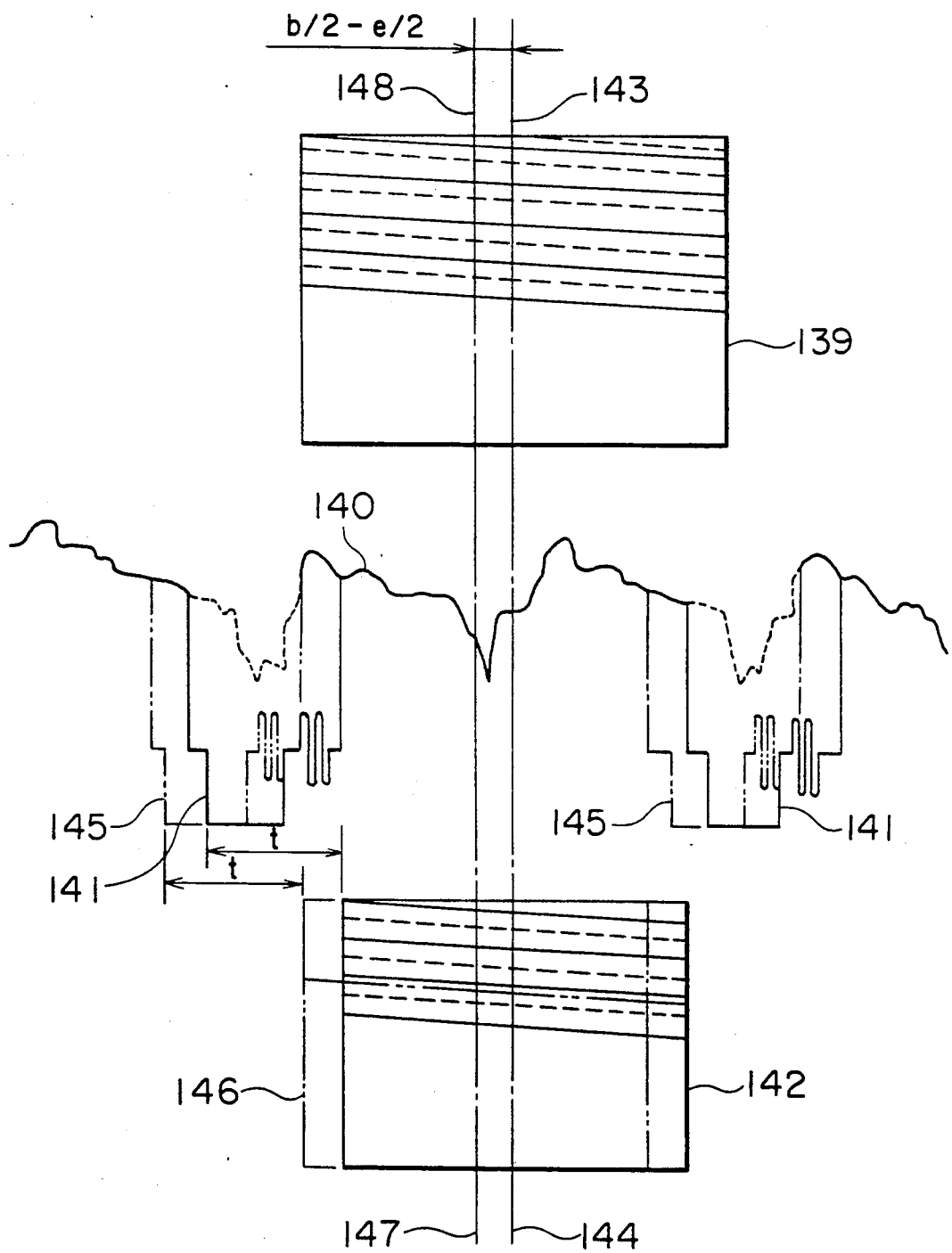
FIGS. 21 to 24 are diagrams showing the stereoscopic image system according to another embodiment of this invention.
Figure 22:
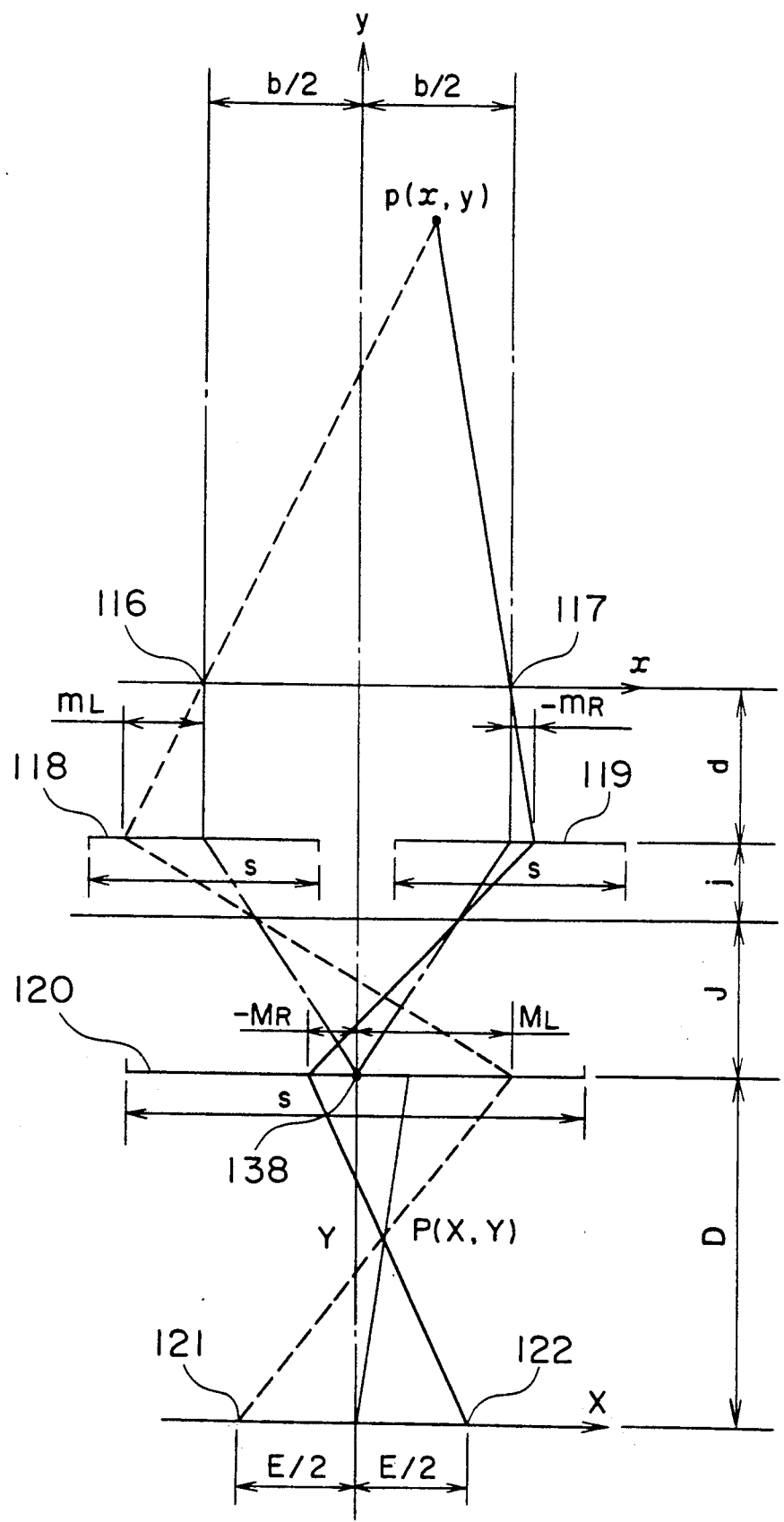
Figure 23:
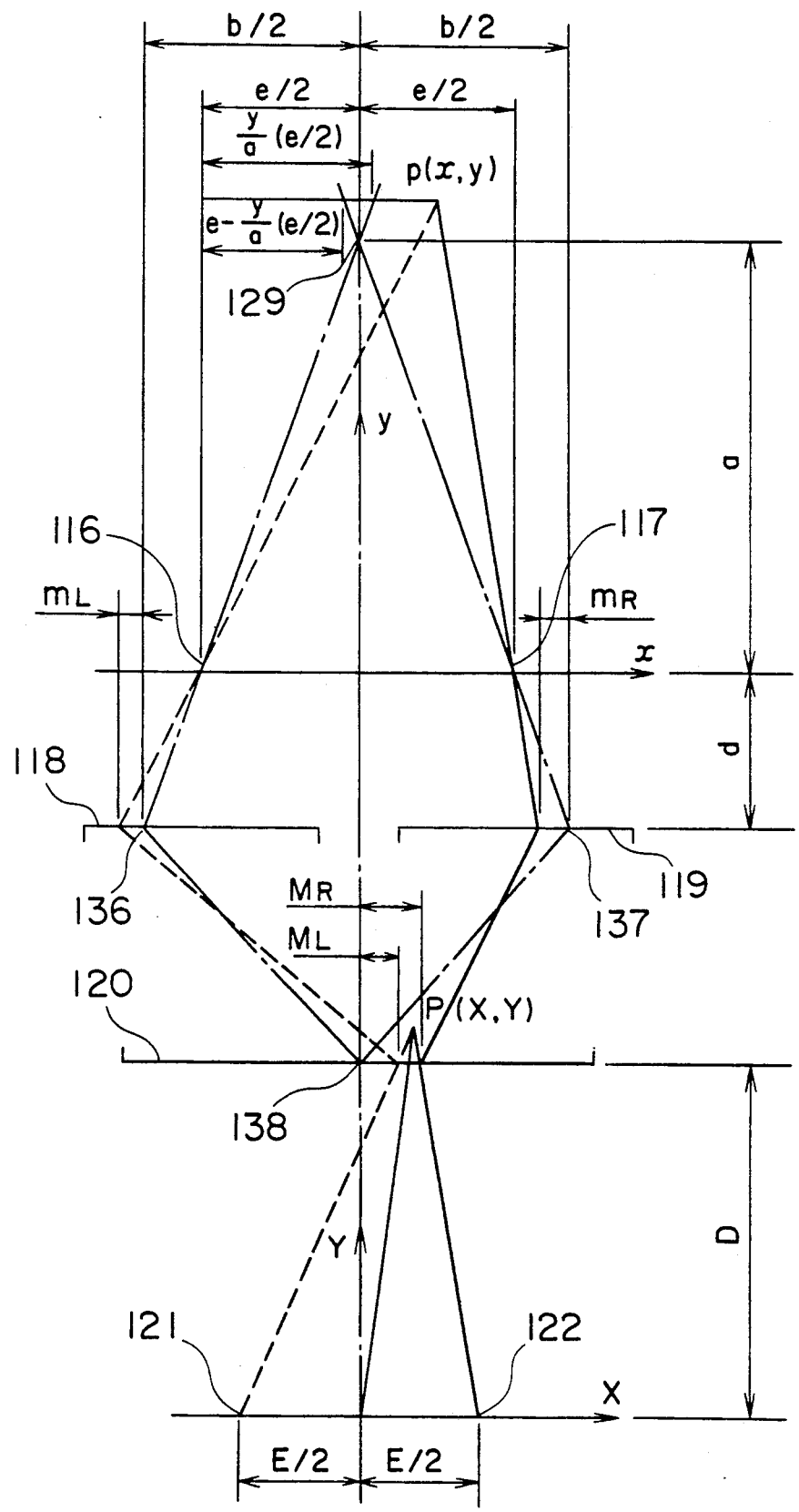

FIG. 21 shows a first method of shifting the image center on the image-forming plane. With interlaced scanning, the image-forming plane is scanned on every other scanning line, and a video signal 140 is thereby obtained. In the video signal, during an interval between the previous scanning and the next scanning, a horizontal or vertical synchronizing signal 141 is put in place of the portion of the video signal corresponding to that interval. On the monitor screen 142, the screen is scanned from the point after the elapse of a fixed time t from when the synchronizing signal is given, thereby changing the video signal into variations of light. At this time, the center 143 of the image-forming plane substantially agrees with the center 144 of the monitor screen. If a synchronizing signal 145 made to occur a little earlier than normal is combined with the video signal 140, it follows that the portion of the video signal advanced earlier than normal is scanned, and therefore, an image of a frame 146 is shown on the monitor screen 142. Therefore, on the monitor screen 146, the image shifts to the right. As a result, the image center 147 of the frame 146 comes to correspond to the center of the image shifted to left on the image-forming plane 139. If the synchronizing signal is delayed, the image shifts to left, so that the image center on the image-forming plane 139 shifts to right. By the foregoing operation, the timing of the synchronizing signal is either advanced or delayed relative to the normal state, and therefore, it is possible to adjust the position of the image center on the image-forming plane.

Figure 24:
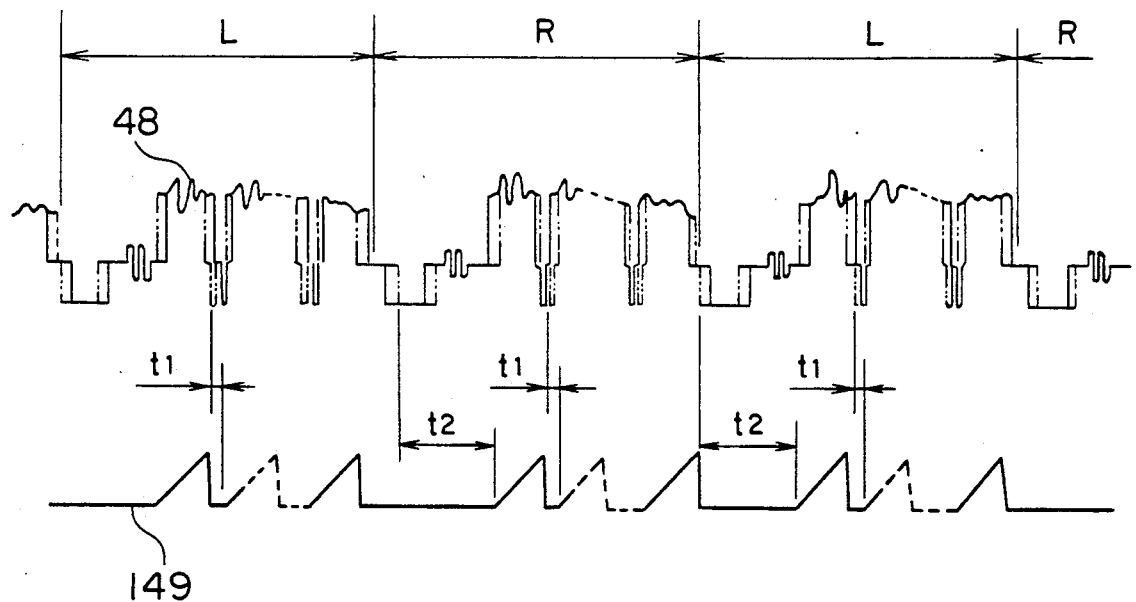

FIG. 24 shows a synthesized signal 148 for a stereoscopic vision, in which signals from the left and right cameras are combined alternately. The ranges indicated by L are the video signal from the left camera and the ranges indicated by R are the video signal from the right camera. The horizontal synchronizing signals for the left and right cameras are shifted in the opposite directions across the wide vertical synchronizing signals, and a horizontal scanning signal 149 causes horizontal scanning to start after a fixed time $t_1$ following the horizontal synchronizing signal. After a vertical synchronizing signal, the first horizontal scanning starts after passage of time $t_2$ following the vertical synchronizing signal. For this operation, the relation of time $t_1$ and time $t_2$ is set so that the period of the sawtooth waves is constant. A color burst signal of the horizontal synchronizing signal is omitted.

Figure 25:
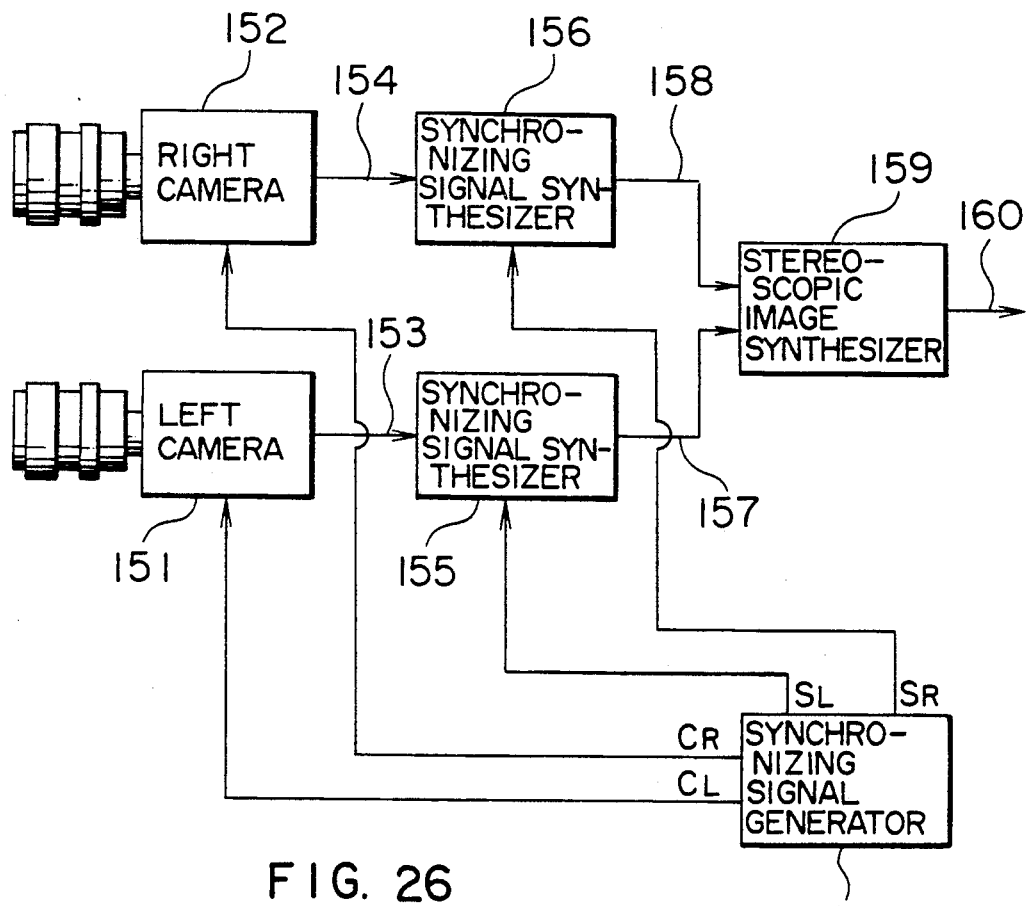
FIGS. 25 to 27 are diagrams showing a further embodiment of this invention.
Figure 26:
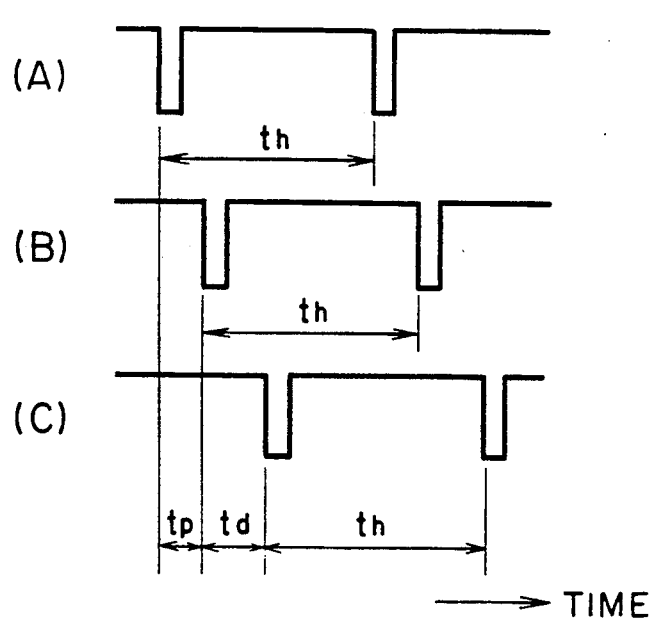

FIG. 25 shows an embodiment by which the synchronizing signal of the stereoscopic camera is shifted. A synchronizing signal generates three kinds of pulse signals, the phase shifts of which are shown in (A), (B), and (C) of FIG. 26. Synchronized with synchronizing signals $C_L$ and $C_R$ provided by the synchronizing signal generator 150, a left camera 151 and a right camera 152 generate video signals 153, 154 and send the signals to synchronizing signal synthesizers 155, 156. The synchronizing signal synthesizers 155, 156 combine the video signals 153, 154 with synchronizing signals $S_L$, $S_R$ provided by the synchronizing signal generator 150, and output synthesized video signals 157, 158. A stereoscopic synthesizer 159 generates a synthesized stereoscopic video signal 160 formed by arranging synthesized video signals 157, 158 alternately, and outputs the synthesized signal. The synchronizing signal generator 150 outputs a pulse signal (B) (FIG. 26) on the lines of synchronizing signals $C_R$, $C_L$ for the television cameras. To shift the image center to left, it is only necessary to send a pulse signal (A) leading the pulse signal (B) as the synchronizing signal $S_L$ or $S_R$, and similarly, to shift the image center to right, it is only necessary to send a pulse signal (C) lagging the pulse signal (B) as the synchronizing signal $S_L$ or $S_R$. By adjusting phase shifts $t_p$ and $t_d$, the position of the image center can be selected arbitrarily.

Figure 27:
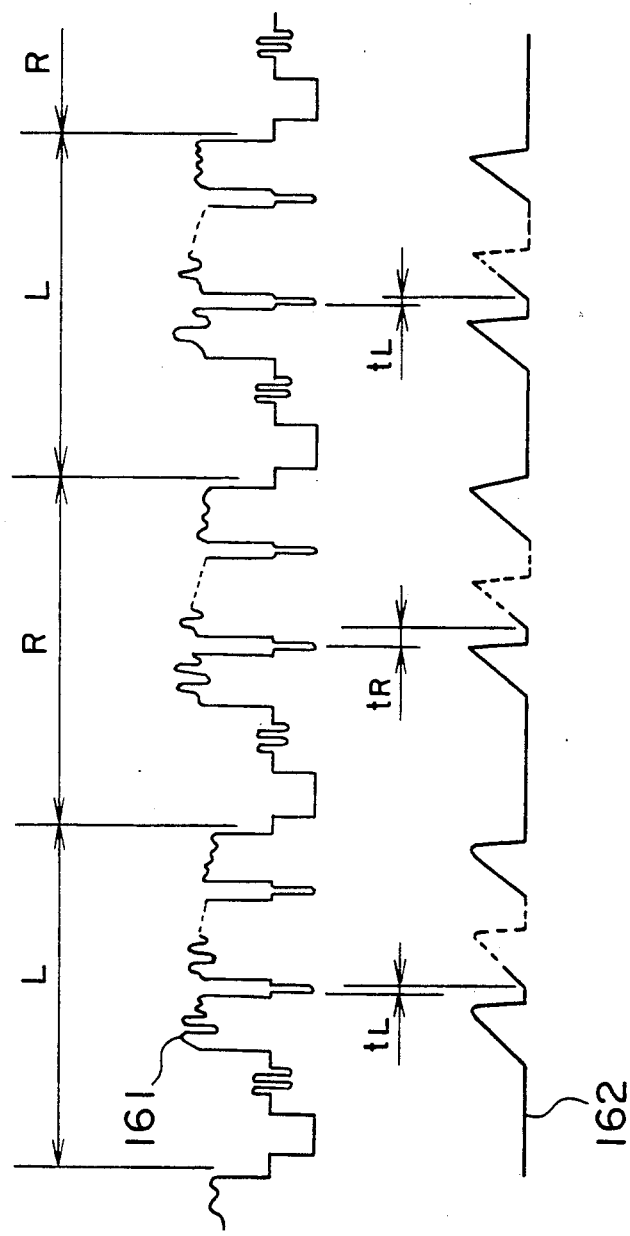

A second method of shifting the image center is to change the time t from when a horizontal synchronizing signal is issued until scanning is started. As shown in FIG. 27, for a synthesized signal 161 for stereoscopic vision, the synchronizing signals are incorporated therein at normal timing, but as for time t from when a horizontal synchronizing signal is given until scanning is started by a horizontal scanning signal, there is difference between $t_L$ and $t_R$. In other words, switchover is done between time $t_L$ and $t_R$ in synchronism with the video signals of the left and right television cameras. Therefore, the same result can be achieved by the horizontal scanning signal as with the horizontal scanning signal 149.

Figure 28:
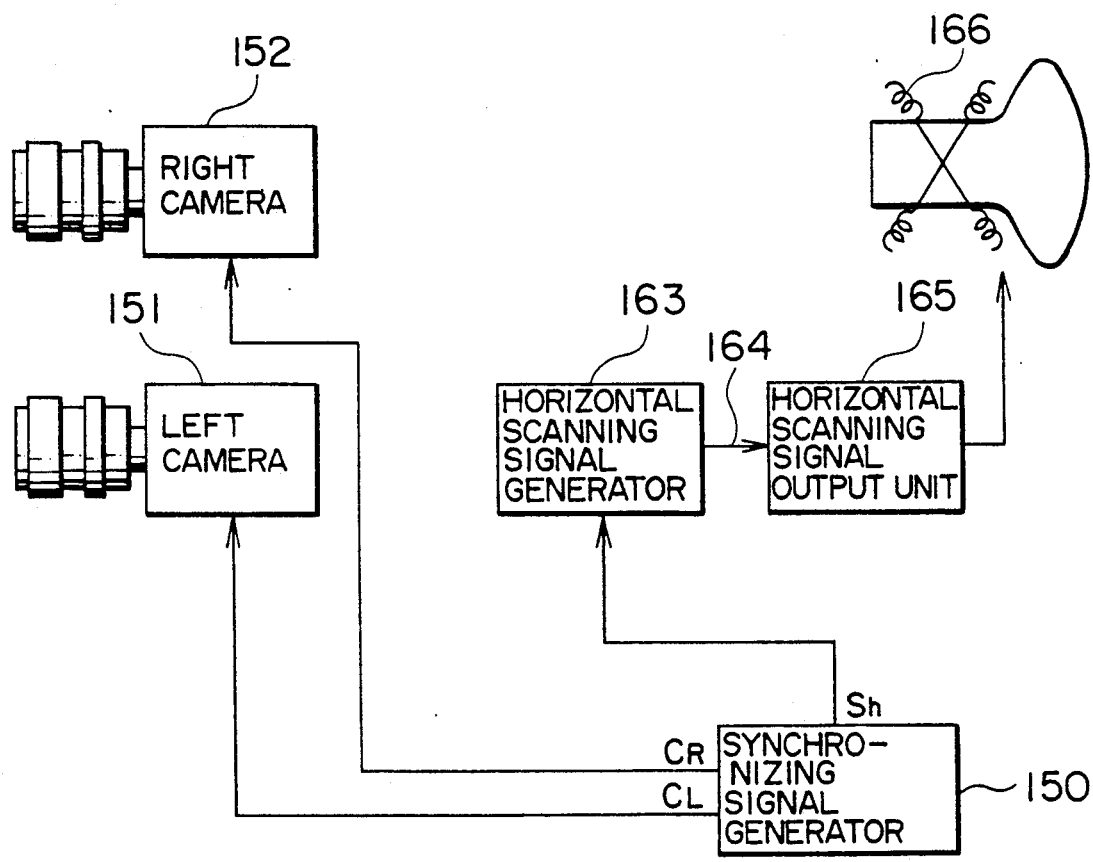
FIGS. 28 and 29 are diagrams showing another embodiment of this invention.
Figure 29:
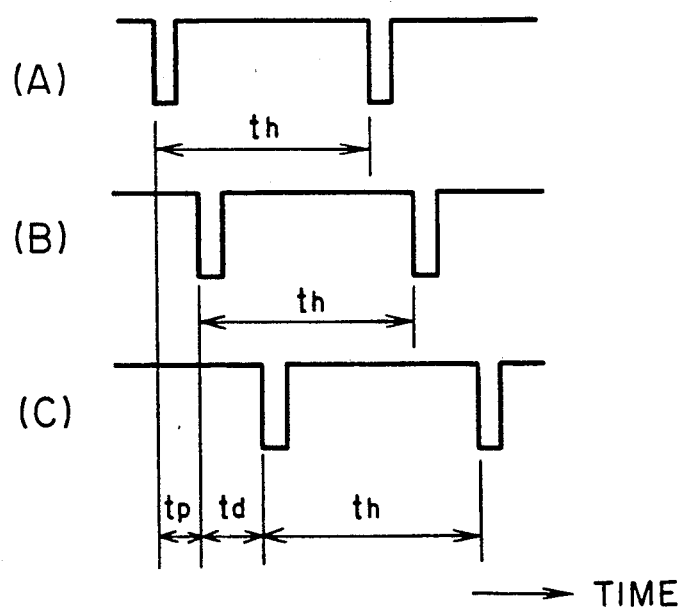

FIG. 28 shows an embodiment using the above-mentioned second method. The synchronizing signal generator 150 sends synchronizing signals $C_R$, $C_L$ to the television cameras 151, 152. Though this is not illustrated, the video signals of the television cameras 151, 152 are combined with the synchronizing signals by ordinary method, and the synthesized signals are sent as a synthesized stereoscopic video signal to the monitor. The synchronizing signal generator 150 sends a horizontal synchronizing signal $S_h$ to a horizontal scanning signal generator 163 of the monitor. This generator generates sawtooth waves 164, which are amplified by a horizontal scanning signal output unit 165 and used to drive a horizontal deflection coil 166. The synchronizing signal generator 150 generates pulse signals whose phases are shifted as indicated by (A), (B) and (C) of FIG. 29, outputs the pulse signals (B) on the lines of synchronizing signals $C_R$, $C_L$ alternately, and outputs a pulse signal (B) or (C) alternately on the line of output $S_h$ to the horizontal scanning signal generator 163 in synchronism with the synchronizing signals $C_R$ and $C_L$. Therefore, the video signals of the left and right television cameras correspond to the horizontal synchronizing signal (A) or (C), and the positions of the image centers of the left and right television cameras can be changed individually by the phase shifts $t_p$ and $t_d$.

Figure 30:
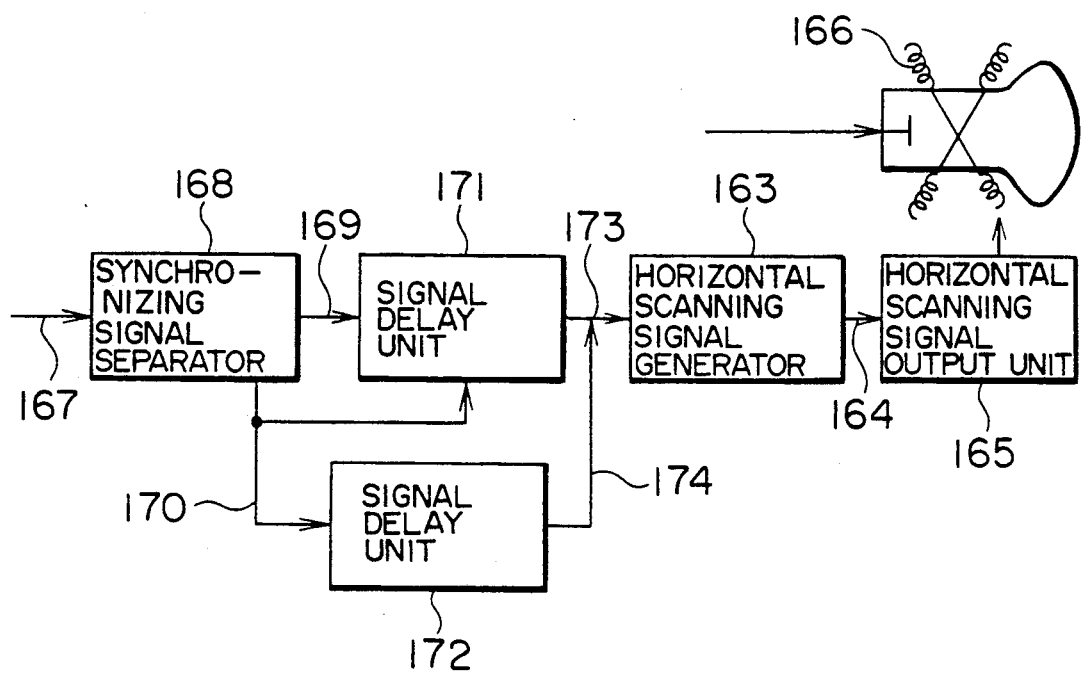
FIGS. 30 and 31 are diagrams showing a still further embodiment of this invention.
Figure 31:
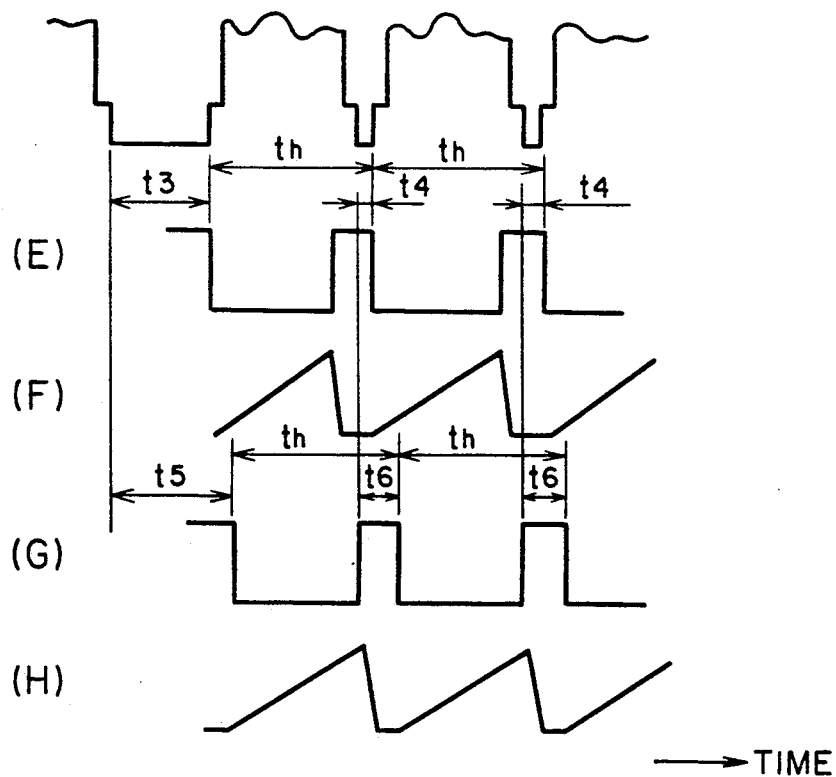

FIG. 30 shows a still another embodiment of this invention. FIG. 31 shows waveforms at various parts. The method illustrated here is to adjust the timing of the horizontal scanning signal based on a synthesized stereoscopic video signal 167 sent from the television cameras. A synchronizing signal separator 168 separates the horizontal synchronizing signal 169 and the vertical synchronizing signal 170 from the synthesized stereoscopic video signal 167. The horizontal and vertical synchronizing signals 169, 170 are input into signal delay units 171, 172, where the signals are added with delay time to become horizontal synchronizing signals 173, 174. The horizontal synchronizing signals 173, 174 are input into the horizontal scanning signal generator 163, which generates sawtooth waves 164, which in turn are amplified by the horizontal scanning signal output unit 165 and used to drive the horizontal deflection coil 166. Delay times $t_4$ and $t_6$ from the horizontal synchronizing signal are switched over from one to another each time a vertical synchronizing signal 170 is input into the signal delay unit 171, and therefore, the left and right video signals correspond to the delays of the horizontal synchronizing signals. The delay times $t_3$ and $t_5$ from the vertical synchronizing signal have only to be set so that their pulse spacings are constant.

A third method for shifting the image center is to use an image memory. Video signals obtained by two television cameras are converted into digital signals through A/D conversion. As shown in FIG. 32, when the digital video signals are input into image input circuits 275, 276, the video signals are recorded in image memories 277, 278. A stereoscopic image synthesizing and reading circuit 279 reads video signals from the two image memories 277, 278 alternately and synthesizes a video signal for stereoscopic viewing. In this process, by changing the start address for reading the image memories, the position of the image is shifted. For example, to advance video signals, the leading portion of the image memory is skipped and reading is started in the middle of the memory. To delay video signals, reading is started at a portion just before the end of the image memory, and when the end point is reached, the reading process returns to the start address, or a dummy signal is added at the leading portion of the memory. In this way, video signals can be delayed.

Now, let us consider a method of changing the enlargement ratio of the stereoscopic iamge. From Eqs. (139), 143), the enlargement ratio of a reproduced stereoscopic image is determined by the ratio between the space E between the eyes of the observer and the space e of the two television cameras. Since the binocular space E is constant for a particular observer, it is only necessary to change the space e between the two television cameras. In this step, it is necessary to abide by the two conditions mentioned earlier. The condition shown by Eq. (142) is not directly related to changing the space e, and is kept as it is. The condition shown by Eq. (145) indicates that if E and D are fixed, the ratio between a and e must be fixed.

From Eq. (124), $$\frac{b-e}{d} = \frac{e}{a} \qquad (146)$$

Figure 33:
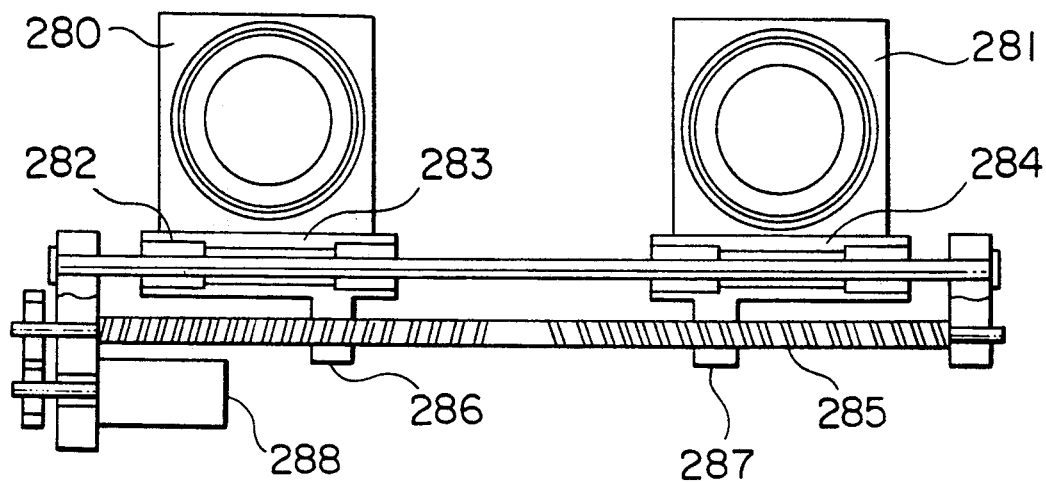

Therefore, so long as d is not changed, if e is changed with the amount of shift of the image center (b-e)/2 kept constant, a varies in proportion to e. Hence, when one wishes to enlarge the stereoscopic image, it is only necessary to reduce the space e between the two television cameras. Conversely, to reduce the image, you have only to increase e. FIG. 33 shows an embodiment of means for adjusting the space e of the cameras. Two television cameras 280, 281 are fixed on slide bases 283, 284 supported by a slide rail 282. The slide bases are made to slide in the opposite directions by a screw rod 285 having threads in the opposite lead directions (LH and RH) formed at both ends thereof and by female screws 286, 287 engaging with the threads of the screw rod. The screw rod 285 is driven by a motor 288.

Incidentally, the position of the observer relative to the monitor screen is closely related to the space, the sizes of the images and image-forming planes, and the lens focal length of the television cameras. In order to obtain a correct stereoscopic image, it is necessary to observe an object at a specified position. However, being confined to a fixed position is often not desirable because freedom of action is lost. To find a solution, let us consider what should be done to make it possible to see a stereoscopic image as it could be seen originally when the observer moves from the specified position.

Figure 34:
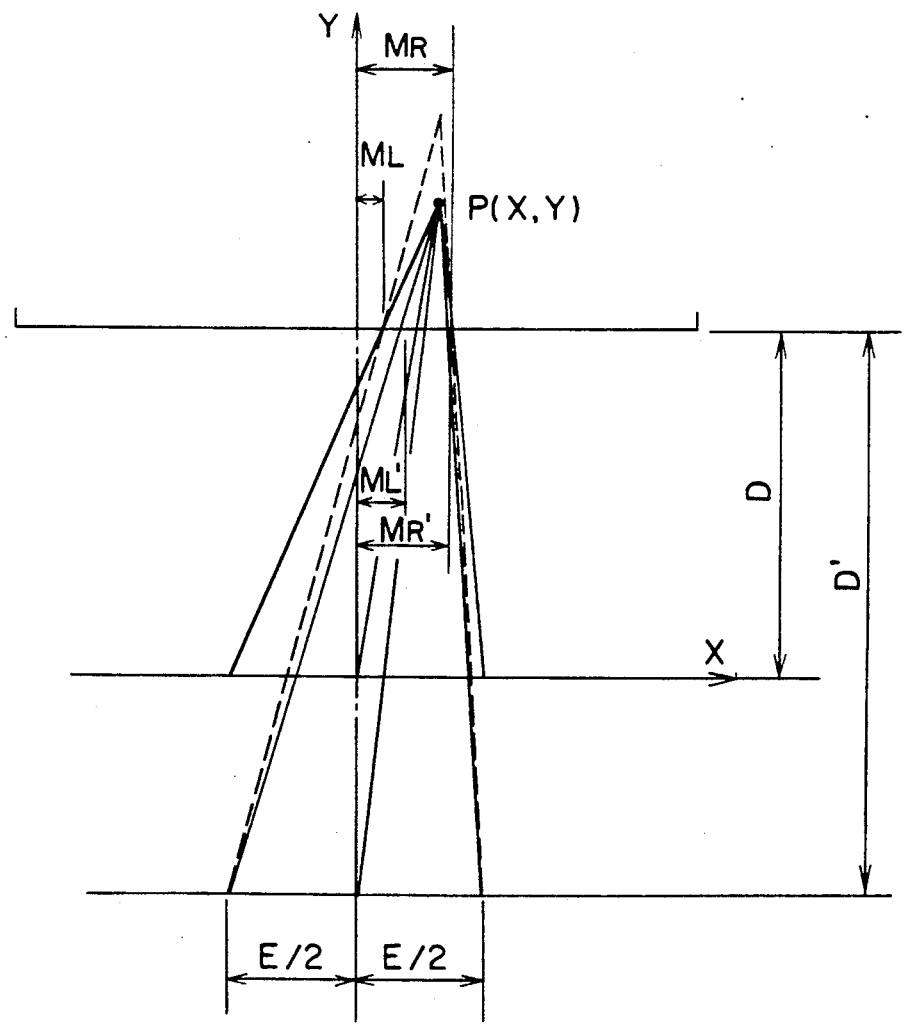
Figure 35:
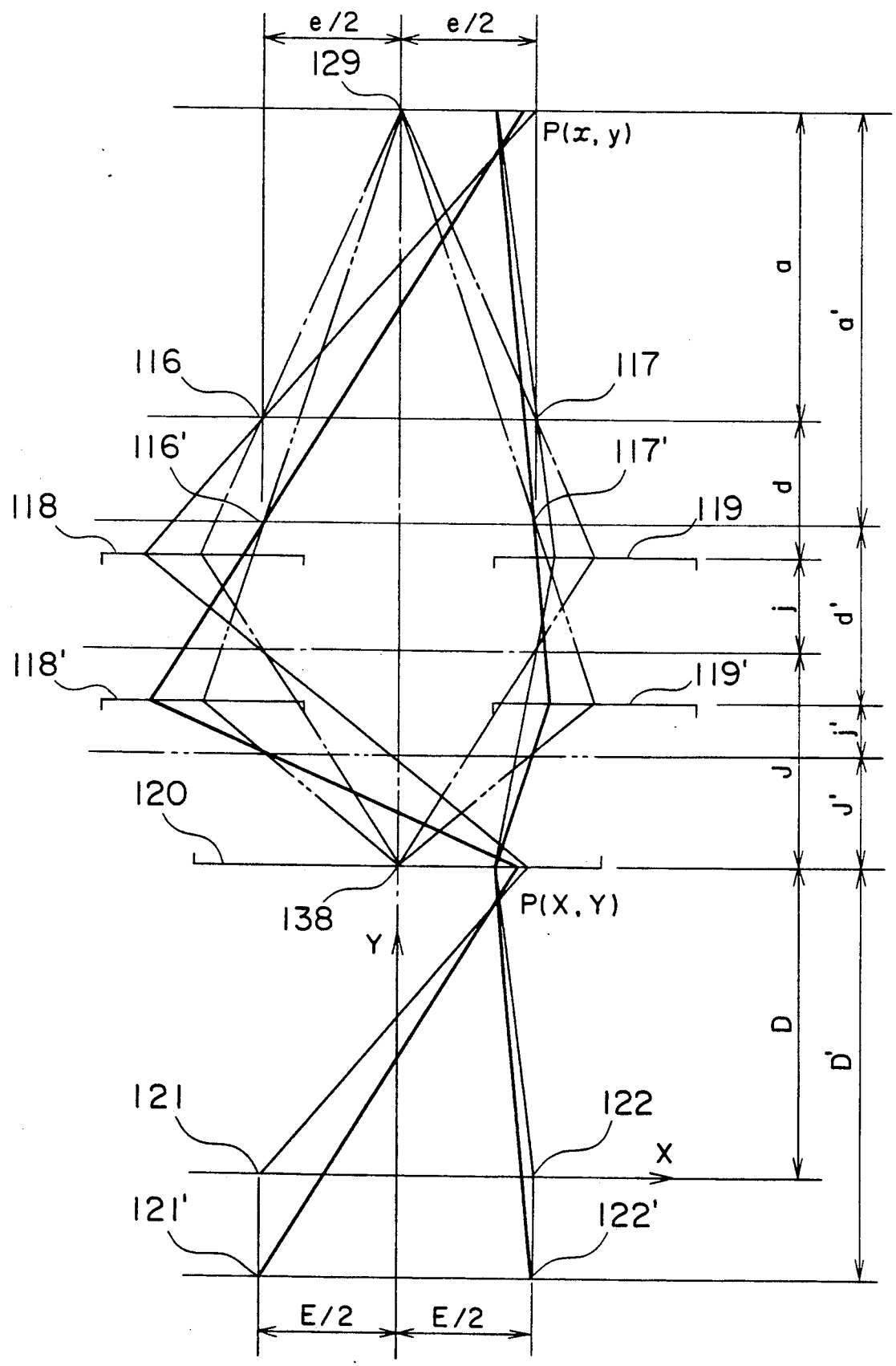

As shown in FIG. 34, suppose that the observation point is moved from the distance D from the monitor screen to the distance D'. If the positions $M_L$, $M_R$ of the image on the monitor screen are located as they used to be, the stereoscopic image P moves rearwards in the direction away from the monitor screen, as indicated by the intersection of the broken lines. Though this is not illustrated, if P is located in front of the monitor screen, P moves to the front side, coming similarly away from the monitor screen. In other words, the longitudinal axis is extended across the monitor screen, and its enlargement ratio comes to differ from that of the transverse axis. To prevent this, it is necessary to change the lengths of a and d to a' and d'. At this time, the relations shown by Eqs. (142), (145) must be maintained. That is to say, from Eqs. (144), (145), and (142), the values of a' and d' can be obtained as:

$$a' = \frac{e}{E} D' \qquad (147)$$

$$d' = \frac{s}{S} D' \qquad (148)$$

From Eq. (138), if e, D, S, and s are fixed a' is in proportion to d'.

Figure 36:
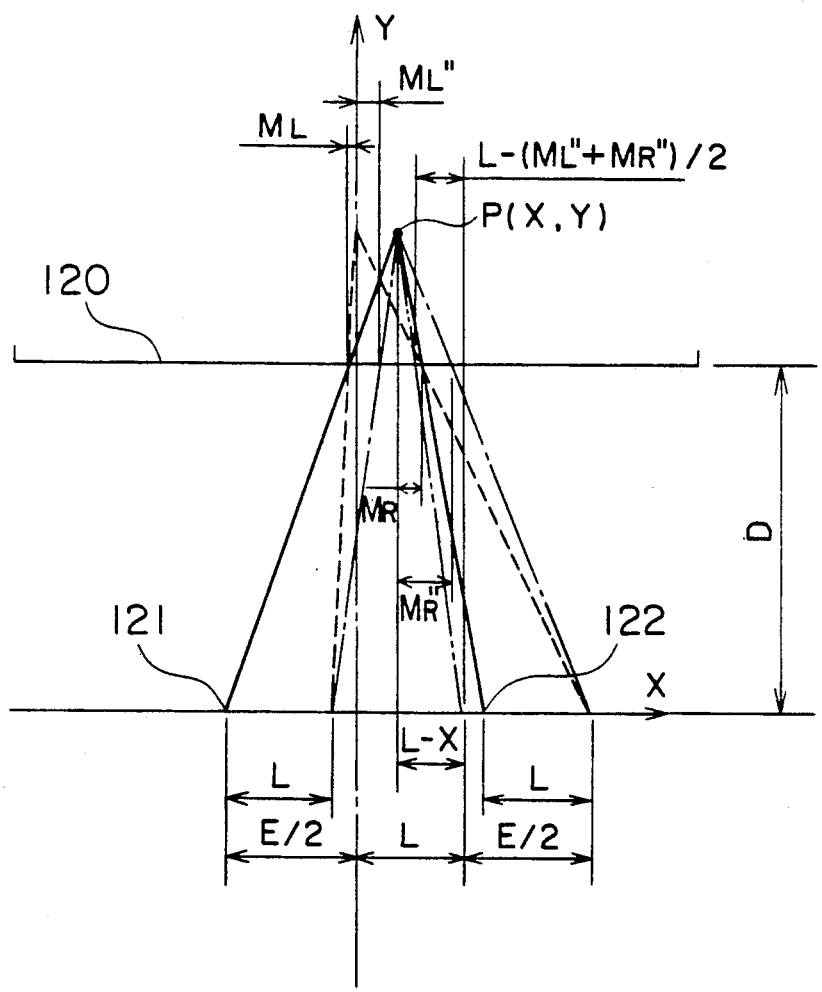

Consider the a case in which the observer moves transversely. As shown in FIG. 36, if the observer moves to right by the distance L, the stereoscopic iamge P moves to left turning about across the screen. Though not illustrated, if P is located in front of the screen, it will move to right. In order for P to be seen at the original position, $M_L$ and $M_R$ must move to $M_L''$ and $M_R''$.

Figure 37:
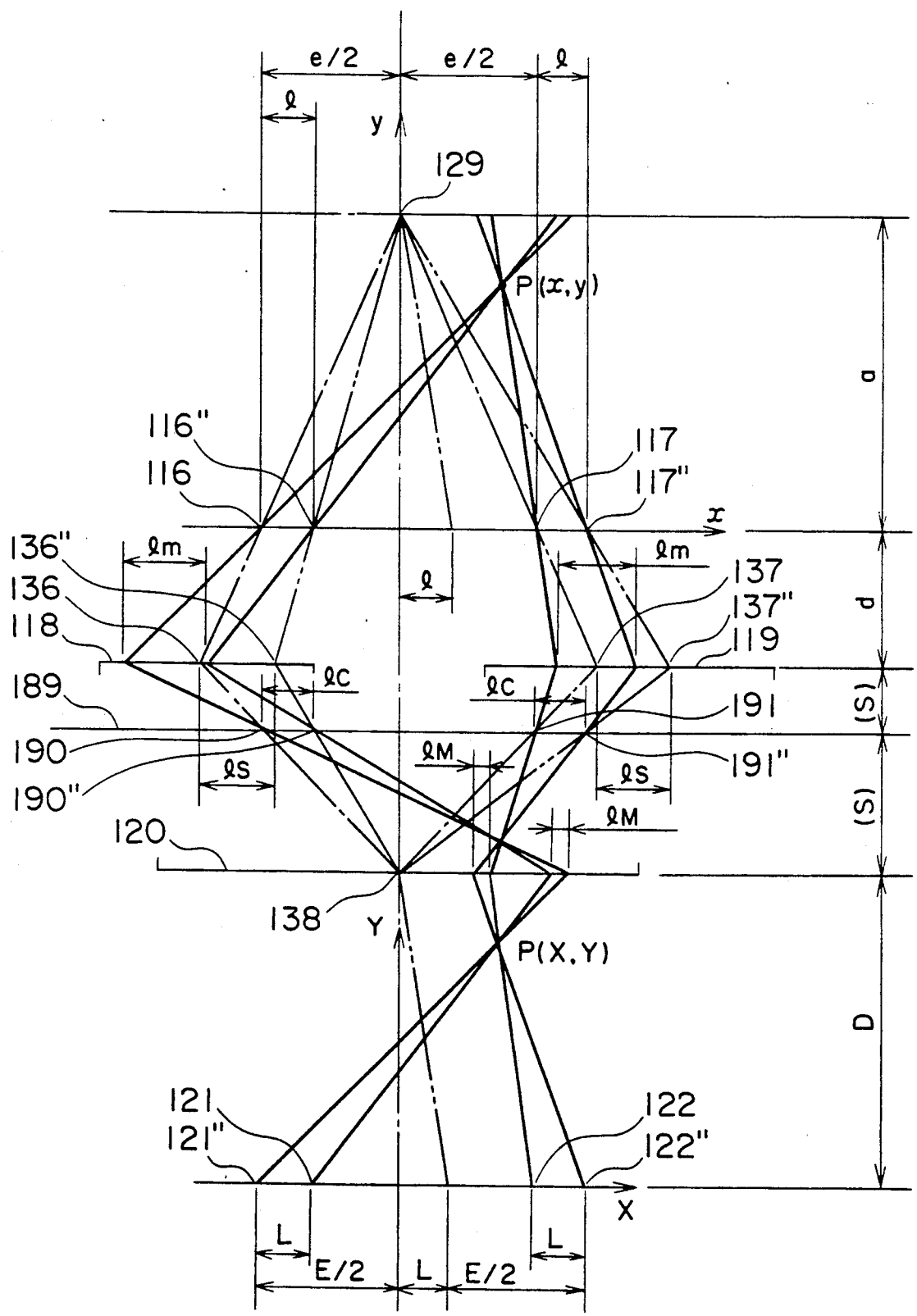

In order for the stereoscopic image P not to move, it is only necessary to move the lenses and the image-forming planes without changing the position of the intersection of the optical axes of the stereoscopic camera as shown in FIG. 37. Suppose that the two lenses move together by l in the right direction. If, at this time, the image centers 136, 137 move to 136'', 137'', this moving distance $l_s$ can be obtained as follows.

By the geometric relation as shown in FIG. 37, $$\frac{l_s}{l} = \frac{a+d}{a} \tag{149}$$

Therefore, $$l_s = \frac{a+d}{a} l \tag{150}$$

The moving distance $l_m$ of the positions of the images of p(x,y) on the image-forming planes is $$\frac{l_m}{l} = \frac{y+d}{y} \tag{151}$$

Therefore, $$l_m = \frac{y+d}{y} l \tag{152}$$

The moving distance lm of the image on the monitor screen 120 is obtained as follows. In FIG. 37, it is assumed that there is a straight line 189 dividing the distance from the image-forming planes 118, 119 to the monitor screen into a ratio between the size s of the image-forming planes and the size S of the monitor screen. If 190. 191 or 190'', 191'' represent the intersections of the straight line 189 and the lines connecting the image centers 136, 137 or 136'', 137'' with the center 138 of the monitor screen, the straight lines connecting the positions of the images on the image-forming planes with the corresponding position of the image on the monitor screen pass through the intersections 190, 191 or 190'', 191''. The distance $l_c$ between 190 and 190'' or between 191 and 191'' is obtained as:

$$\frac{l_c}{l_s} = \frac{S}{S+s} \tag{153}$$

Substituting Eq. (150) into Eq. (153), $$l_c = \frac{S}{S+s} \cdot \frac{a+d}{a} l \tag{154}$$

Figure 38:
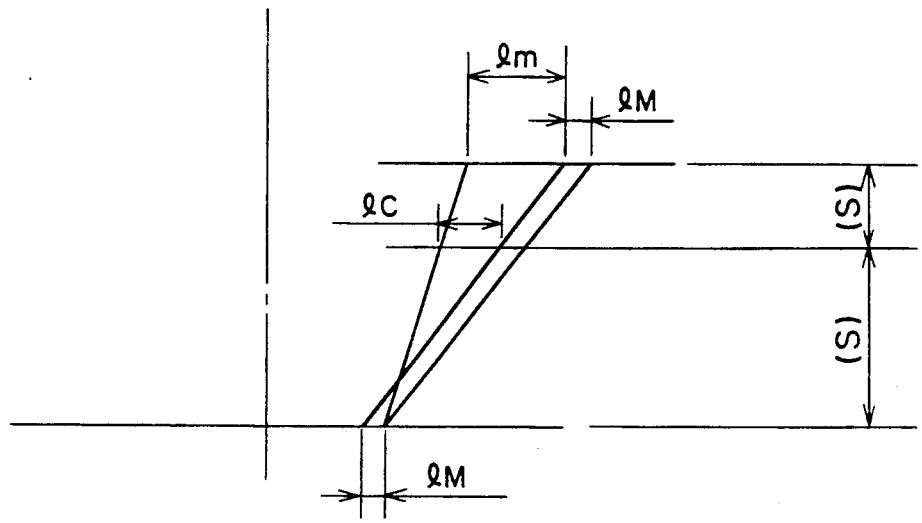
Figure 39:
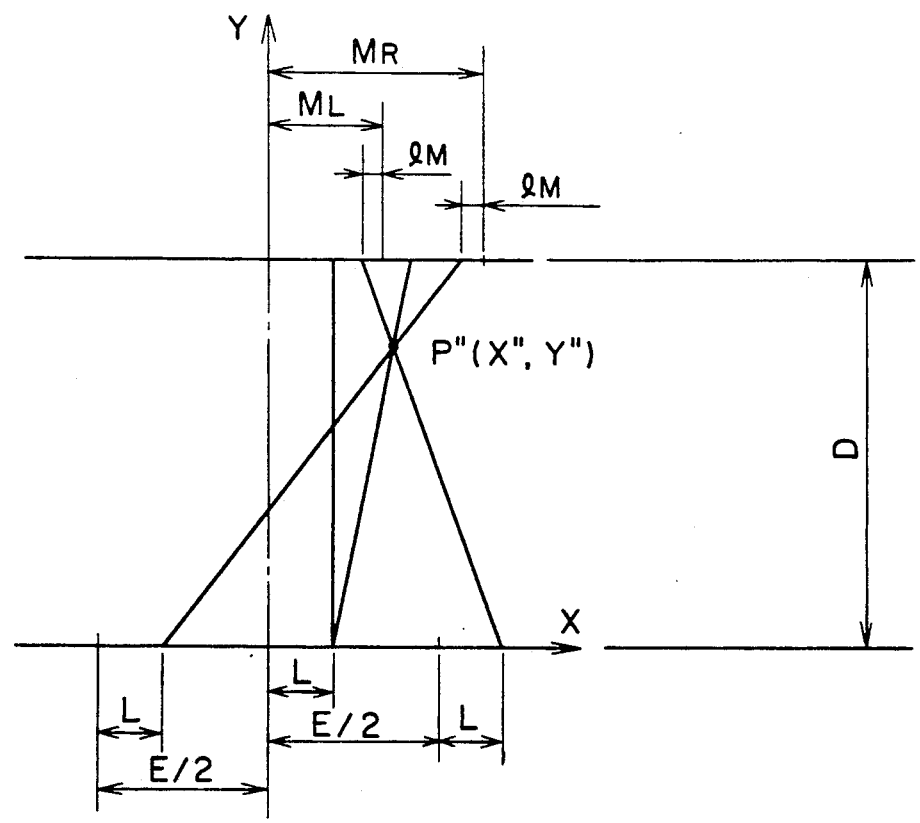

From the relation shown in FIG. 38, $$\frac{l_m + l_M}{l_c + l_M} = \frac{S+s}{S} \tag{155}$$

Therefore, by using Eqs. (152), (153), we have:

$$l_M = \frac{S}{s} l_m - \frac{S+s}{s} l_c \tag{156}$$

$$= \frac{S}{s}\left(\frac{y+d}{y} - \frac{a+d}{a}\right)l$$

Suppose that the positions of the observer's eyes are moved by L in the right direction. If the position of the image under observation is denoted by P'' (X'',Y''), $$\frac{\{(M_L - l_M) + (M_R - l_M)\}/2 - L}{X'' - L} = \frac{D}{Y''} \tag{157}$$

$$\frac{(M_R - l_M) - (M_L - l_M)}{(E/2 - L) + (E/2 + L)} = \frac{D - Y''}{Y''} \tag{158}$$

From Eq. (158), $$(M_R - M_L)Y'' = E(D - Y'') \tag{159}$$

Therefore, $$Y'' = \frac{ED}{M_R - M_L + E} \tag{160}$$

From Eq. (157), $$X'' = \frac{M_L + M_R - 2l_M - 2L}{2D} Y'' + L \tag{161}$$

Substituting Eq. (160) into Eq. (161), $$X'' = \frac{E(M_L + M_R - 2l_M - 2L)}{2(M_R - M_L + E)} + L \tag{162}$$

On the other hand, the position of the original stereoscopic image P(X,Y) is:

$$\frac{(M_L + M_R)/2}{X} = \frac{D}{Y} \tag{163}$$

$$\frac{M_R - M_L}{E} = \frac{D - Y}{Y} \tag{164}$$

From Eq. (164), $$Y = \frac{ED}{M_R - M_L + E} \tag{165}$$

$$X = \frac{M_L + M_R}{2D} Y \tag{166}$$

Substituting Eq. (165) into Eq. (166), $$X = \frac{E(M_L + M_R)}{2(M_R - M_L + E)} \tag{167}$$

From Eqs. (160), (165), $$Y'' = Y \tag{168}$$

Thus, it is understood that Y does not change. From Eqs. (163), (164), $$M_L + M_R = \frac{2DX}{Y} \tag{169}$$

Using Eqs. (161), (166), and (169), the positional shift in the X-axis direction is obtained.

$$X'' - X = \frac{M_L + M_R - 2(l_M + L)}{2D} Y + L - \frac{M_L + M_R}{2D} Y \quad (170)$$

$$= \frac{2DX - 2(l_M + L)Y}{2D} + L - \frac{2DX}{2D}$$

$$= L - \frac{(l_M + L)Y}{D}$$

Substituting Eqs. (143), (156) into Eq. (170), we have:

$$X'' - X = \frac{LD - \left\{ \frac{S}{s}\left(\frac{y+d}{y} - \frac{a+d}{a}\right)l + L \right\} \frac{E}{e} y}{D} \quad (171)$$

$$= \frac{\frac{E}{e}\left(\frac{S}{s}\frac{a+d}{a}l - \frac{S}{s}l - L\right)y + LD - \frac{S}{s}\frac{E}{e}ld}{D}$$

$$= \frac{\frac{E}{e}\left(\frac{S}{s}\frac{d}{a}l - L\right)y + LD - \frac{S}{s}\frac{E}{e}ld}{D}$$

Substituting Eq. (142), $$X'' - X = \frac{\frac{E}{e}\left(\frac{D}{a}l - L\right)y + \left(L - \frac{E}{e}l\right)D}{D} \quad (172)$$

Further substituting Eq. (145), $$X'' - X = \frac{\left(\frac{D}{a}l - L\right)\left(\frac{E}{e}y - D\right)}{D} \quad (173)$$

Assuming here $$l = \frac{a}{D}L \quad (174)$$

The result is $$X'' - X = 0 \quad (175)$$

X'' is always equal to X. If, as shown above, the condition shown by Eq. (174) as well as the conditions shown by Eqs. (142), (143) are satisfied, the position of the image does not change even if the observer moves transversely. The condition of Eq. (174) can be expressed by using Eq. (145) as follows.

$$\frac{L}{l} = \frac{D}{a} = \frac{E}{e} = v \quad (176)$$

To be more specific, it is necessary to set a ratio between the transverse moving distance L of the observer and the transverse moving distance l of the camera lenses so as to be equal to the enlargement ratio $v$ of the stereoscopic image. In order for the intersection 129 of the optical axes of the television cameras not to change regardless of the transverse movement of the camera lenses, it is needless to say necessary to move the image centers 136, 137 transversely by $l_s$ as indicated by Eq. (150).

If the foregoing is summarized, in order to prevent the position of the stereoscopic image P(X,Y) from moving relative to the monitor screen even if the position of the observer moves from the specified position, it is only necessary to perform the following:

(1) When the distance between the observer and the monitor screen changes, change the focal length d of the lenses so that the change rate of a, a'/a, and the change rate of d, d'/d, become equal to the change rate of D, D'/D, and move the cameras in the back-and-forth (longitudinal) direction.

Figure 40:
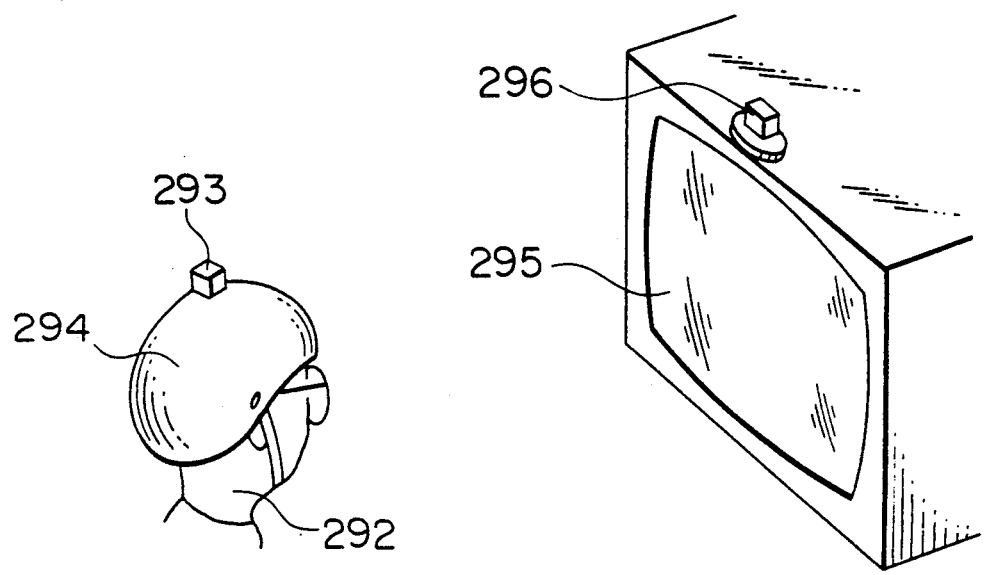
FIGS. 40 to 44 are diagrams showing an additional embodiment of this invention.
Figure 41:
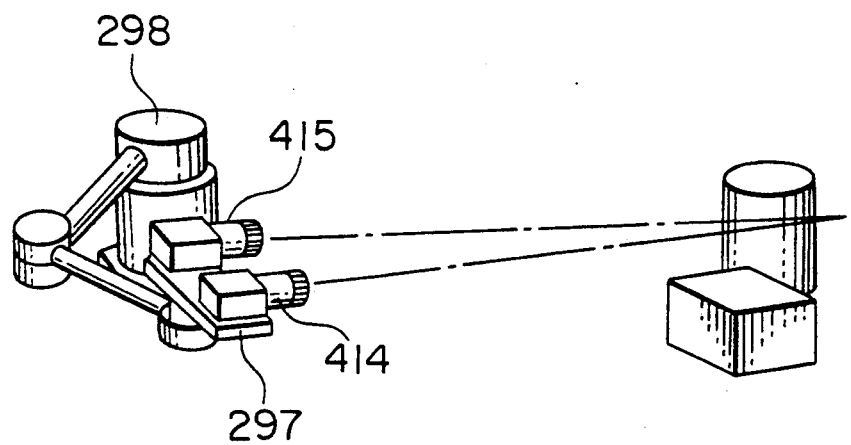

(2) When the observer moves in the transverse direction by L, move the television camera lenses transversely by the value l, obtained by dividing L by the enlargement ratio $v$ of the stereoscopic image. In addition the positions of the image centers on the image-forming planes must be moved transversely by a/e times l. A possible method for performing the above-mentioned adjustment automatically is described in the following. FIG. 40 shows an example of the measuring method of the positional changes, D' and L, of the observer. The observer 292 wears a helmet 194 fitted with a magnetic sensor 293. The monitor 295 is provided with a saucer 296 for producing an artificial magnetic field. On receiving the artificial magnetic field from the saucer 296, the magnetic sensor 293 outputs a signal in accordance with the position thereof. By this output, it is possible to detect the position of the magnetic sensor relative to the saucer 296, and D' and L can be detected by this magnetic sensor. As for means for adjusting positions a' and l of the stereoscopic camera 297, a robot arm 298 as shown in FIG. 41 is used, but and X-Y table may be used.

Figure 42:
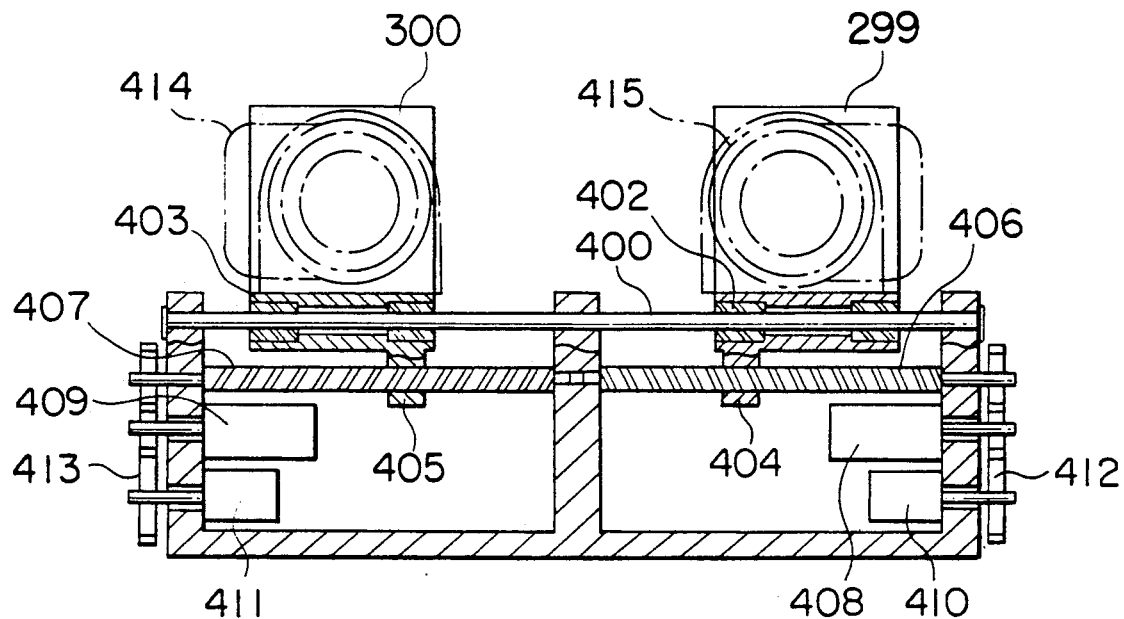
Figure 43:
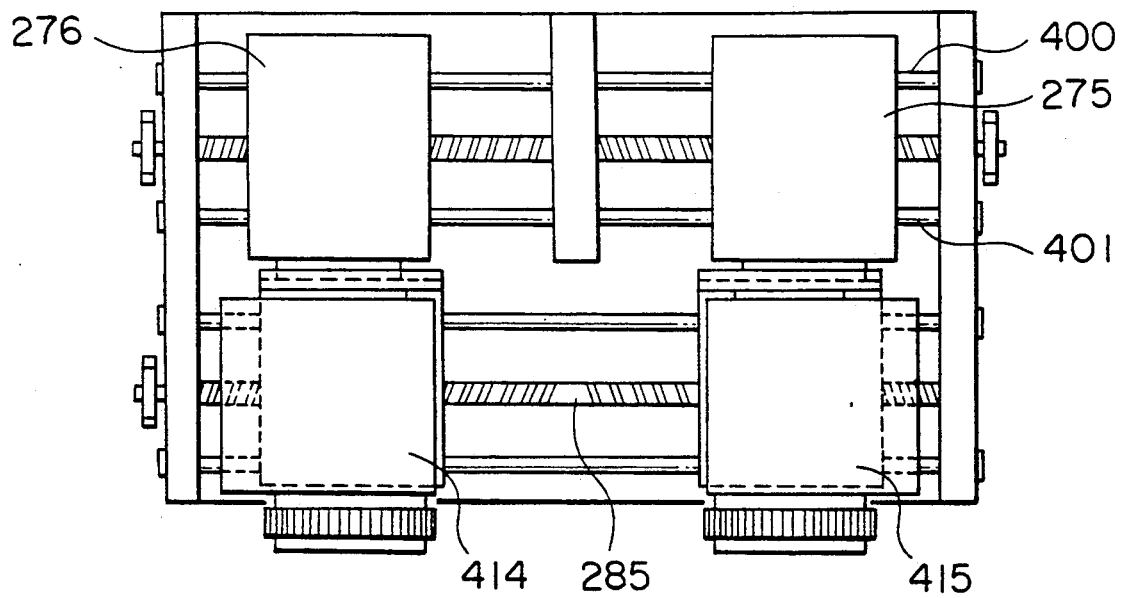

FIGS. 42 and 43 show an embodiment of the stereoscopic camera 297. Two television cameras 299, 300 are mounted on side bases 402, 403 supported by slide levers 400, 401. The female screws 404, 405 attached to the slide bases 402, 403 engage with screw rods 406, 407. As the screw rods 406, 407 are driven by driving motors 408, 409, the positions of the slide bases 402, 403 can be changed independently. Since sensors 410, 411 for position detection are interlocked with the screw rods 406, 407 with the intermediary of gears 412, 413, the slide bases 402, 403 can be positioned at specified positions by means of a position servo or the like. At the front side of the television cameras 299, 300, there is provided space adjusting means similar to the one shown in FIG. 30. This space adjusting means is used only to adjust the space between the lenses. The lenses used here are electric telephoto lenses 414, 415. The space between the lenses 414, 415 can be adjusted by the screw rod 285 having LH and RH threads formed on the opposite sides thereof.

Figure 44:
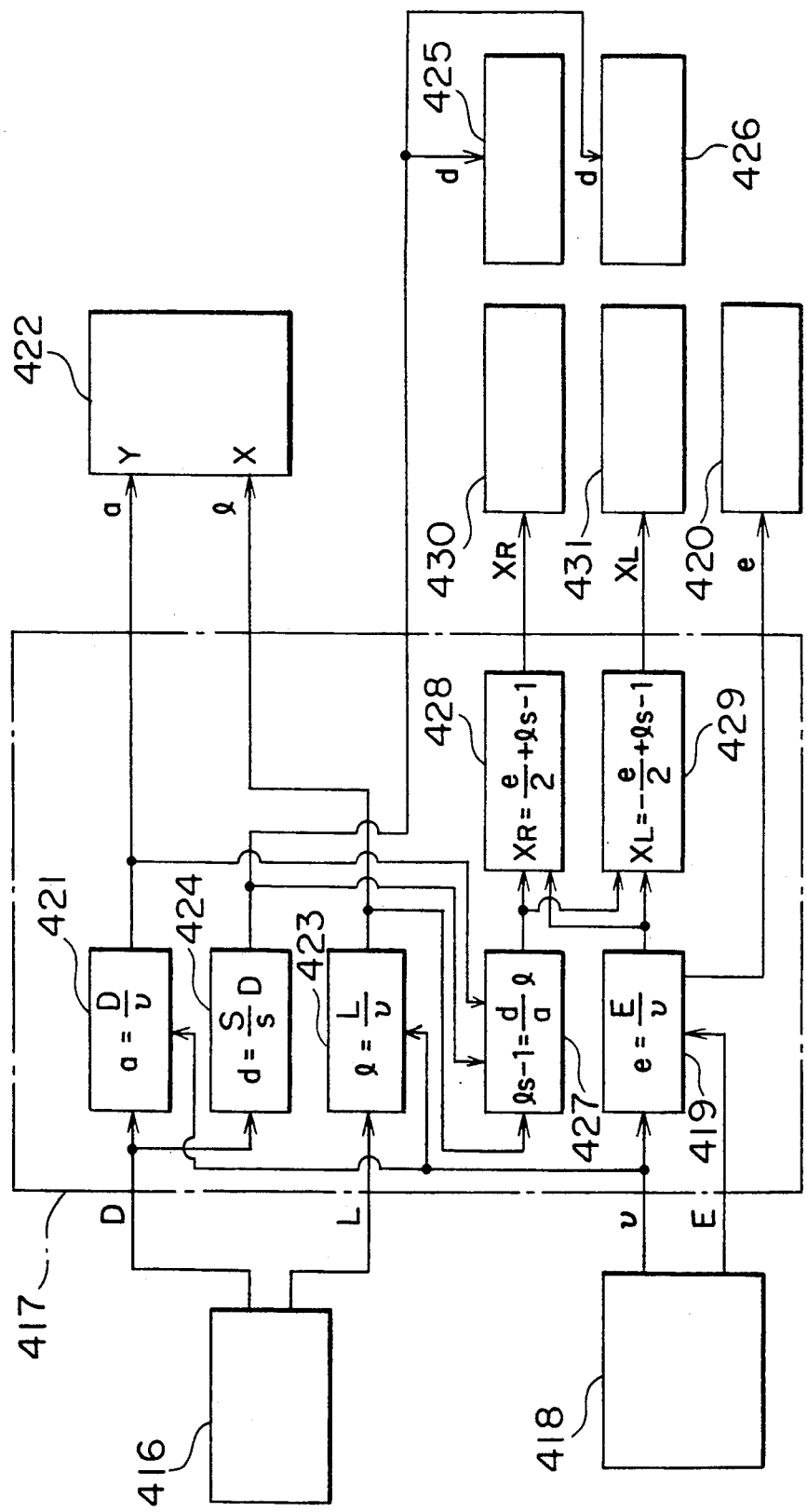

FIG. 44 shows a control block diagram. A magnetic sensor control unit 416 inputs signals representing the distance D from the observer to the screen and the transverse moving distance L relative to the center line of the monitor screen into an arithmetic and control unit 417. The observer's binocular space E and the enlargement ratio of the stereoscopic image are input into the arithmetic and control unit 417. The arithmetic and control unit 417 obtains e from signals of E and $v$ at an arithmetic block 419, and outputs e to a controller 420 of the television camera space adjusting unit to set the value of e. An arithmetic block 421 obtains a from signals of D, and outputs a to a control unit 422 for the robot. An arithmetic block 423 obtains l from L and $\nu$, and outputs l to the control unit 422 for the robot. As a result, the robot 298 moves so that the position of the stereoscopic camera 297 becomes predetermined by values of a and l. An arithmetic block 424 obtains the distance d between the optical centers of the lenses and the image-forming planes from the image-forming plane size a and the monitor screen size S, which have been predetermined, and sends the distance d to the controllers 425, 426 for zoom lenses in order to adjust the optical system. An arithmetic block 427 obtains the moving distance $l_s$ of the image-forming planes from data on a, d, and l. From the result of this as well as the value of e, arithmetic blocks 428, 429 obtain the positions $X_R$ and $X_L$, which data are then input into position controllers 430, 431, which control the television cameras to move to a specified position.

As has been discussed, even if the binocular space differs among the observers, the space of the lenses of the television cameras can be adjusted, the enlargement ratio $\nu$ of the stereoscopic image, and the stereoscopic image is prevented from being distorted or moved when the observer changes his position.

According to this invention, video signals of two television cameras can be shifted in parallel, so that an accurate stereoscopic vision without distortion can be obtained. In addition, even if the observer is away from the specified position, he can get a correct stereoscopic image.

We claim:

1. A stereoscopic imaging system enabling observation of a stereoscopic image by reproducing, on a single screen in an image-reproducing means, two images of an object, the two images being taken by two imaging units and having parallax therebetween, and by observing the two images in such a manner that the left and right eyes of the observer observe only separate images taken separately by the two imaging units, the two imaging units corresponding to the left and right eyes, wherein normals of the respective image-forming planes of said two imaging units are arranged in parallel, wherein the distance between the optical centers of the lenses of said two imaging units is set so as to be shorter than the distance between the centers of said image-forming planes, and wherein both a ratio $(b-e)/E$, between the distance obtained by subtracting said distance e between the lenses from the image-forming planes b of said two imaging units and the distance E of the binocular space of said observer, and a ratio $d/D$, between the distance d from said image-forming planes to the optical centers of said lenses and the distance D from said observer to said screen, are substantially equal to a ratio f of the size of images on said image-forming planes to the size of an image on said screen.

2. A stereoscopic imaging system enabling observation of a stereoscopic image by reproducing, on a single screen in an image-reproducing means, two images of an object, the two images being taken by two imaging units and having parallax therebetween and by observing the two images in such a manner that the left and right eyes of the observer observe only separate images taken separately by the two imaging units, the two imaging units corresponding to the left and right eyes, wherein normals of the respective image-forming planes of said two imaging units are arranged in parallel, and wherein there is provided electronic circuit means for shifting to the left or the right the center of a reproduced image in such a manner that the distance between the optical centers of the lenses of said two imaging units becomes shorter than the distance between the centers of said respective image-forming planes.

3. A stereoscopic imaging system according to claim 2, wherein said electronic circuit means includes a time adjusting circuit for advancing or delaying the timing of a combining horizontal synchronizing signals with said video signals obtained by said two imaging units in taking an image of an object.

4. A stereoscopic imaging system according to claim 2, wherein said electronic adjusting circuit is a time adjusting circuit for advancing or delaying time from when a horizontal synchronizing signal is received until horizontal scanning is started by a horizontal scanning signal.

5. A stereoscopic imaging system according to claim 2, further comprising an image memory for storing video signals from said imaging units, and a stereoscopic image synthesizing circuit for reading video signals by changing a start address when video signals stored in said image memory are read out.

6. A stereoscopic imaging system comprising:
lens space adjusting means for adjusting the space between the optical axes of lenses of two television imaging units while keeping the optical axes of the lenses in parallel;
control means for controlling said lens space adjusting means to control the space between the optical axes of said lenses so as to be a predetermined value; and
input means for inputting an enlargement ratio $\nu = E/e$ of a stereoscopic image into the control means, where e is the space between the two lenses and E is the binocular space of an observer.
wherein in response to said enlargement ratio, said control means controls said lens space adjusting means to adjust the space between the optical axes of the lenses of said two television imaging units.

7. A stereoscopic imaging system comprising:
detecting means for detecting the positions of the eyes of an observer;
image-forming planes moving means for moving the image-forming planes of two television imaging units;
zoom lenses having a specified zoom ratio, respectively provided for said television imaging units;
zoom lenses moving means for moving said zoom lenses; and
control means for controlling the zoom lens positions, image-forming plane positions, and said zoom ratio according to an output signal representing the eye positions detected by said detecting means in order to prevent a stereoscopic image observed by the observer from being distorted or moved.

* * * * *